US009260632B2

(12) United States Patent
Goeb et al.

(10) Patent No.: US 9,260,632 B2
(45) Date of Patent: Feb. 16, 2016

(54) PRIMERLESS MULTILAYER ADHESIVE FILM FOR BONDING GLASS SUBSTRATES

(71) Applicant: 3M INNOVATIVE PROPERTIES COMPANY, St. Paul, MN (US)

(72) Inventors: Siegfried R. Goeb, Willich (DE); Silke D. Mechernich, Dusseldorf (DE); Steffen Traser, Darmstadt (DE); Claudia Torre, Dusseldorf (DE); Jan D. Forster, Aachen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/349,912

(22) PCT Filed: Oct. 5, 2012

(86) PCT No.: PCT/US2012/058889
§ 371 (c)(1),
(2) Date: Apr. 4, 2014

(87) PCT Pub. No.: WO2013/055581
PCT Pub. Date: Apr. 18, 2013

(65) Prior Publication Data
US 2014/0255679 A1  Sep. 11, 2014

(30) Foreign Application Priority Data
Oct. 14, 2011 (EP) .................................. 11185273

(51) Int. Cl.
B32B 7/12 (2006.01)
B32B 15/04 (2006.01)
(Continued)

(52) U.S. Cl.
CPC ................. *C09J 7/0217* (2013.01); *B32B 7/12* (2013.01); *B32B 15/046* (2013.01); *B32B 17/06* (2013.01);
(Continued)

(58) Field of Classification Search
CPC ........ C09J 7/00; C09J 133/062; C09J 143/04; C08F 220/06
See application file for complete search history.

(56) References Cited

U.S. PATENT DOCUMENTS
4,684,571 A   8/1987   Kunert
4,721,648 A   1/1988   Kleine-Doepke
(Continued)

FOREIGN PATENT DOCUMENTS
DE   202008013473 U1   5/2009
DE   202009013255 U1   3/2010
(Continued)

OTHER PUBLICATIONS
Crowley, "A Three-Dimensional Approach to Solubility", Journal of Paint Technology, May 1966, vol. 38, No. 496, pp. 269-280.
(Continued)

*Primary Examiner* — Victor Chang
(74) *Attorney, Agent, or Firm* — Jean A. Lown

(57) ABSTRACT

A multilayer pressure sensitive adhesive (PSA) film having a first pressure sensitive adhesive layer for bonding glass substrates and at least a second opposing layer, the first pressure sensitive adhesive layer being a polymerization reaction product of a precursor comprising a monomer or a partially prepolymerized monomer, having a curable ethylenically unsaturated group, whereas the precursor further comprises an oligomeric organofunctional silicone having at least 2 Si atoms, in particular 2 to 10 Si atoms,
  wherein the monomer having a curable ethylenically unsaturated further has a coupling group with a Zerewitinow-active H-atom and wherein the oligomeric organofunctional silicone has at least one coupling group which is reactive to the coupling group of the monomer having a curable ethylenically unsaturated group,
  or
  wherein the oligomeric organofunctional silicone has at least one coupling group with a Zerewitinow-active H-atom and wherein the monomer having a curable ethylenically unsaturated further has a coupling group which is reactive to the coupling group of the oligomeric organofunctional silicone;
  with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group.

15 Claims, 4 Drawing Sheets

(51) Int. Cl.
*C09J 7/02* (2006.01)
*C09J 7/00* (2006.01)
*C09J 133/06* (2006.01)
*C09J 143/04* (2006.01)
*C08F 220/18* (2006.01)
*C09J 151/00* (2006.01)
*C03C 27/04* (2006.01)
*B32B 17/06* (2006.01)

(52) U.S. Cl.
CPC ............. *C03C 27/048* (2013.01); *C08F 220/18* (2013.01); *C09J 7/00* (2013.01); *C09J 133/062* (2013.01); *C09J 143/04* (2013.01); *C09J 151/003* (2013.01); *B32B 2457/12* (2013.01); *C09J 2201/36* (2013.01); *C09J 2203/322* (2013.01); *C09J 2205/114* (2013.01); *C09J 2433/00* (2013.01); *C09J 2451/00* (2013.01); *C09J 2483/00* (2013.01); *Y10T 428/249954* (2015.04); *Y10T 428/249978* (2015.04); *Y10T 428/287* (2015.01); *Y10T 428/2891* (2015.01)

(56) References Cited

U.S. PATENT DOCUMENTS

| | | | |
|---|---|---|---|
| 4,818,610 | A | 4/1989 | Zimmerman |
| 4,894,259 | A | 1/1990 | Kuller |
| 4,950,344 | A | 8/1990 | Glover |
| 4,950,537 | A | 8/1990 | Vesley |
| 5,612,092 | A | 3/1997 | Strenger |
| 6,348,118 | B1 | 2/2002 | Johnson |
| 6,596,787 | B1 | 7/2003 | Levandoski |
| 7,268,173 | B2 | 9/2007 | Graichen |
| 7,910,163 | B2 | 3/2011 | Zollner |
| 7,935,383 | B2 | 5/2011 | Zollner |
| 8,449,962 | B2 | 5/2013 | Prenzel |
| 8,802,777 | B2 | 8/2014 | Zöllner |
| 2003/0057660 | A1 | 3/2003 | Ortmuller |
| 2005/0081993 | A1 | 4/2005 | Ilkka |
| 2006/0159915 | A1 | 7/2006 | Chang |
| 2008/0071044 | A1 | 3/2008 | Keite-Telgenbuscher |
| 2009/0053447 | A1 | 2/2009 | Zollner |
| 2009/0233093 | A1 | 9/2009 | Toyama |
| 2010/0137524 | A1 | 6/2010 | Grittner |
| 2011/0274843 | A1 | 11/2011 | Grittner |
| 2011/0281964 | A1 | 11/2011 | Zmarsly |
| 2011/0285177 | A1 | 11/2011 | Flammer |
| 2012/0029105 | A1 | 2/2012 | Czerwonatis |
| 2013/0004694 | A1 | 1/2013 | Hitschmann |
| 2014/0154485 | A1 | 6/2014 | Traser |

FOREIGN PATENT DOCUMENTS

| | | |
|---|---|---|
| EP | 0157566 | 10/1985 |
| EP | 0752435 | 1/1997 |
| WO | WO 95/23772 | 9/1995 |
| WO | WO 98/07802 | 2/1998 |
| WO | WO 03/048067 | 6/2003 |
| WO | WO 2009/079647 | 6/2009 |

OTHER PUBLICATIONS

Ellis, "Solvents", Chapter 2.7 from *Paint Testing Manual, Physical and Chemical Examination of Paints, Varnishes, Lacquers, and Colors*, G.G. Sward, Editor, Thirteenth Edition, American Society for Testing and Materials, Philadelphia, Pennsylvania, (1972), pp. 130-149.

Fink, Handbook of Engineering and Specialty Thermoplastics, vol. 2, Water Soluble Polymers, Chapter 10.1.2 "Addition Polymerization", pp. 345-347, Scrivener Publishing LLC, (2011).

Kistler, "Liquid Film Coating: Scientific principles and their technological implications", First Edition, Chapman & Hall, pp. 9-10 (1997).

Kistler, "Liquid Film Coating: Scientific principles and their technological implications", First Edition, Chapman & Hall, London, England, Chapter 12, "Self-Metered Coating Processes", pp. 539-672, (1997).

Kistler, "Liquid Film Coating: Scientific principles and their technological implications", First Edition, Chapman & Hall, London, England, Chapter 13, "Free-Meniscus Coating Processes", pp. 673-708, (1997).

Kroschwitz, (Eds.); Kirk-Othmer Encyclopedia of Chemical Technology, 4th Edition; John Wiley & Sons, New York; vol. 6, Chlorocarbons and Chlorohydrocarbons—$C_2$ to Combustion Technology, pp. 610-615 (1993).

Pape, "Adhesion Promoters", Chapter 15, from *Handbook of Adhesives and Surface Preparation: Technology, Applications and Manufacturing*, S. Ebnesajjad, Editor, Elsevier, Inc., (2011), pp. 369-386.

Petrie, Handbook of Adhesives and Sealants, Chapter 7, "Primers and Adhesion Promoters", pp. 253-278, McGraw-Hill, (2000).

Petrie, Handbook of Adhesives and Sealants, Second Edition, Chapter 10, "Primers and Adhesion Promoters", pp. 277-305, McGraw-Hill (2007).

Petrie, Handbook of Adhesives and Sealants, Second Edition, Part III, Sealant Systems, Chapter 18, "Sealant Formulation", pp. 547-559, McGraw-Hill, (2007).

Tesoro, "Silane Coupling Agents: The Role of the Organofunctional Group", Journal of Adhesion Science Technology, 1991, vol. 5, No. 10, pp. 771-784.

Commercial Brochure, Form No. 26-1328-01, Down Corning, "A Guide to Silane Solutions from Dow Corning", 2005, 30 pages.

Corporate Presentation, Momentive Performance Materials, "OrganoFunctional Silanes Applications: Short introduction to silanes in Polymer modification: Organofuctional Silane Oligomers for CAS", 25 pages (date unknown but believed to be prior to the date of the filing of the present application).

1507 Extended EP Search Report, mailed Jun. 12, 2012, 13 pages.
International Search Report for PCT/US2012/058889, mailed Mar. 25, 2013, 4 pages.

PRIMERLESS MULTILAYER ADHESIVE FILM FOR BONDING GLASS SUBSTRATES

CROSS REFERENCE TO RELATED APPLICATION

This application claims priority to European Patent Application 11185273.7, filed on Oct. 14, 2011, the disclosure of which is incorporated by reference in their entirety.

TECHNICAL FIELD OF THE INVENTION

This invention relates to a multilayer pressure sensitive adhesive (PSA) film having a first pressure sensitive adhesive layer for bonding glass substrates and at least a second opposing layer, wherein at least the first pressure sensitive adhesive layer comprises a pressure sensitive adhesive and an oligomeric silicone. The invention furthermore relates to a continuous process of forming a multilayer film comprising at least two superimposed polymer layers and to a multilayer film obtainable by the process of the present disclosure.

BACKGROUND OF THE INVENTION

For bonding glass substrates with an adhesive, in particular with an adhesive tape, the glass surface is typically pretreated in order to enhance the bond strength of the adhesive. This is achieved by the application of a primer prior to the application of the adhesive tape. Such a two-step procedure is recited for example in US 2005/0081993 A1 (Ilkka et al.), in which a silane primer is used to prepare the glass surface. In the following step, an acrylic PSA-tape is applied to the pretreated surface, whereas the adhesive tape may be a dual-layer film. Another possibility is to pre-treat the surface of the PSA-tape before application to the glass surface. Alternatively, the silane may be incorporated into the adhesive layer of the film by mixing it into the PSA formulation.

In EP 0 889 106 A1 (Johnson et al.), a single layer adhesive film is recited, which is obtained by photopolymerization of a monomeric mixture comprising an acrylic ester and an epoxy resin, whereas the composition may further comprise an organofunctional silane.

A single layer film may however not satisfy the bonding requirements for different substrates, which is however often required for bonding solar panels, which have typically a glass backside. In addition, the silane impregnated tapes recited in the documents mentioned above show a limited shelf-life. In addition, the bond strength to glass surfaces may strongly decrease over time under environmental influence, in particular humidity which may finally lead to a bond break.

SUMMARY OF THE INVENTION

The present invention provides a self-stick adhesive film of the before mentioned type which develops a strong bond to glass surface, whereas this bond shows a higher resistance to climatic influences, in particular in a humid environment.

In one aspect, the present invention relates to a multilayer pressure sensitive adhesive (PSA) film having a first pressure sensitive adhesive layer for bonding glass substrates and at least a second opposing layer, the first pressure sensitive adhesive layer being a polymerization reaction product of a precursor comprising a monomer or a partially prepolymerized monomer having a curable ethylenically unsaturated group, whereas the precursor further comprises an oligomeric organofunctional silicone having at least 2 Si atoms, in particular 2 to 10 Si atoms, wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group, or wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;

with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group.

In another aspect, a continuous self-metered process of forming a multilayer film having pressure sensitive characteristics and comprising at least two superimposed polymer layers is provided, wherein the process comprises the steps of:

(i) providing a substrate;
(ii) providing two or more coating knives which are offset, independently from each other, from said substrate to form a gap normal to the surface of the substrate;
(iii) moving the substrate relative to the coating knives in a downstream direction;
(iv) providing curable liquid precursors of the polymers to the upstream side of the coating knives thereby coating the two or more precursors through the respective gaps as superimposed layers onto the substrate, the precursor comprising a monomer or a partially prepolymerized monomer, the monomer having a curable ethylenically unsaturated group, whereas the precursor further comprises an oligomeric organofunctional silicone having at least 2 Si atoms, in particular 2 to 10 Si atoms, wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group, or wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;

with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group;

(v) optionally providing one or more solid films and applying these essentially simultaneously with the formation of the adjacent lower polymer layer, and (vi) curing the precursor of the multilayer film thus obtained;

wherein a lower layer of a curable liquid precursor is covered by an adjacent upper layer of a curable liquid precursor or a film, respectively,
whereas
at least one of the precursors has pressure sensitive characteristics after the curing step (vi) in particular the precursor comprising the oligomeric silicone.

In still another aspect, the present invention relates to a multilayer pressure sensitive adhesive film obtainable by the process as described above.

According to still another aspect of the invention, it is provided an assembly comprising a substrate having a surface energy of 300 mJ/m$^2$ or more, in particular a glass substrate, and a multilayer PSA film as above described, wherein the multilayer PSA film is attached to the substrate surface with its first pressure sensitive adhesive layer.

In yet another aspect, the present invention relates to the use of a multilayer PSA film as above described in structural glazing applications, in particular for adhesively bonding a glass substrate to a metallic surface which is preferably a metallic frame comprising a material selected from the group consisting of aluminum, steel, stainless steel, PVC, composite materials, and any combinations or mixtures thereof.

BRIEF DESCRIPTION OF THE DRAWINGS

The current invention is described in more detail with the following examples and figures.

DETAILED DESCRIPTION OF THE INVENTION

Figure 1:
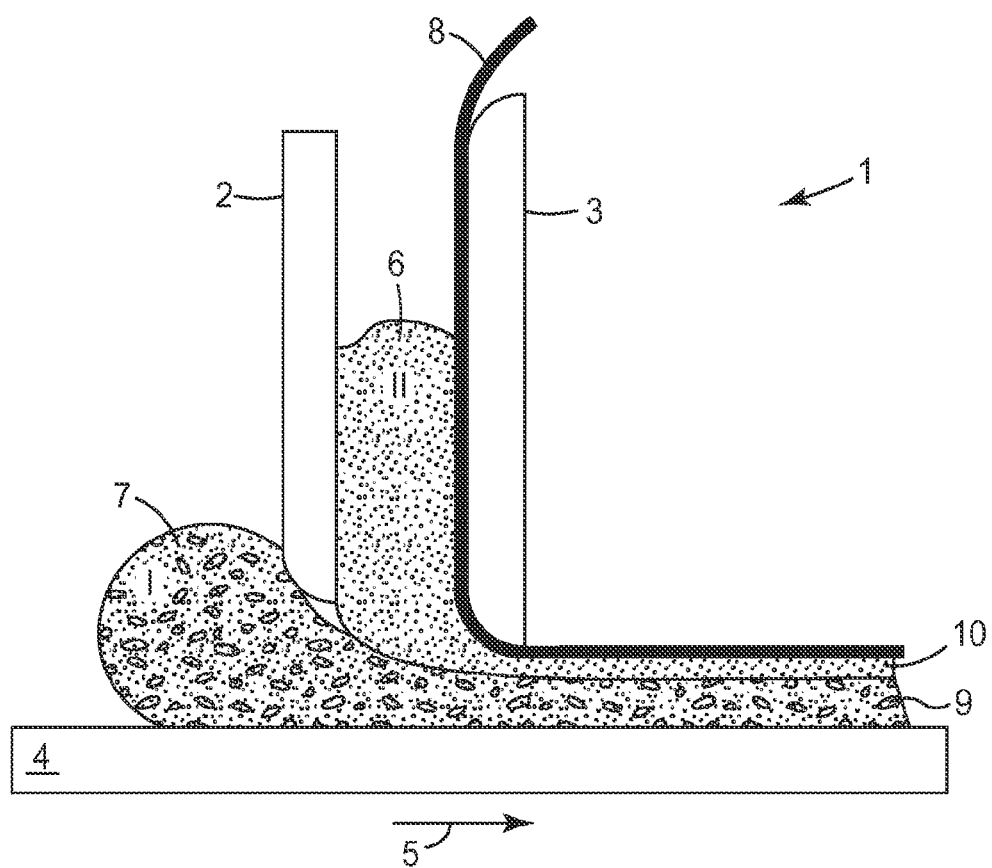
FIG. 1 is a schematic cross-sectional representation of a coating apparatus to carry out the inventive method.

The multilayer PSA films of this invention can be used in many technical applications, in particular under such circumstances where at least one glass substrate needs to be bonded to a surface. A special field of application is the bonding of the glass backside of solar panels to mounting constructions, which are often made of metallic materials or have coated metal surfaces, especially in outdoor applications.

It has been found that by incorporation of an oligomeric organofunctional silicone into a pressure sensitive adhesive precursor, a multilayer PSA film with increased shelf-life and reduced sensitivity against humidity after application of the film is obtained. Organofunctional silicones are well known in the art and a typical general formula of an organofunctional silicone is described e.g. in EP 0 889 106 B1 (Johnson et al.), paragraphs [0020]-[0021]. The coupling group of the oligomeric silicone allows the chemical coupling of the silicone into the polymeric chain of the actual PSA polymer. To apply such a tape no primering of the substrate surface or the film is necessary as for some applications of the before mentioned prior art, because the silicone is part of the polymeric chain. The chemical integration of the silicone functionality into the actual PSA polymer further increases the shelf life of such a product.

According to the present invention, the one of the monomer having a curable ethylenically unsaturated group or the oligomeric silicone comprises a coupling group having a Zerewitinow-active H-atom. A Zerewitinow-active H-atom is an acidic H-atom or "active" H-atom, which can be determined as generally known by its reactivity with respect to Grignard compositions. The amount of Zerewitinow-active H-atoms is typically measured by the methane evolution resulting from a reaction of the substance to be determined with methylmagnesiumbromide (CH$_3$—MgBr) according to the following equation:

$$CH_3—MgBr+ROH \rightarrow CH_4+Mg(OR)Br$$

The group having a Zerewitinow-active H-atom can be selected for example from C—H acidic organic groups, —OH, —SH, —COOH, —NH$_2$ or —NHR with R being an organic rest.

The oligomeric silicone may comprise just one coupling group of any of the two before-mentioned types. It is however preferred that the oligomeric silicone has at least one coupling group per Si-atom.

In this context, it is especially preferred that the monomer having the curable ethylenically unsaturated group and the coupling group with a Zerewitinow-active H-atom is selected from acrylic acid and/or methacrylic acid.

The corresponding group to react with a group having a Zerewitinow-active H-atom can be selected e.g. from an epoxy group, —NCO, —SCO or an aziridine group.

Throughout the present description, the expressions "curable ethylenically unsaturated group" and "curable ethylene group" may be used interchangeably.

The reaction between the coupling group and the carboxyl group of the monomer shall be explained with an epoxy group as coupling group and (meth)acrylic acid:

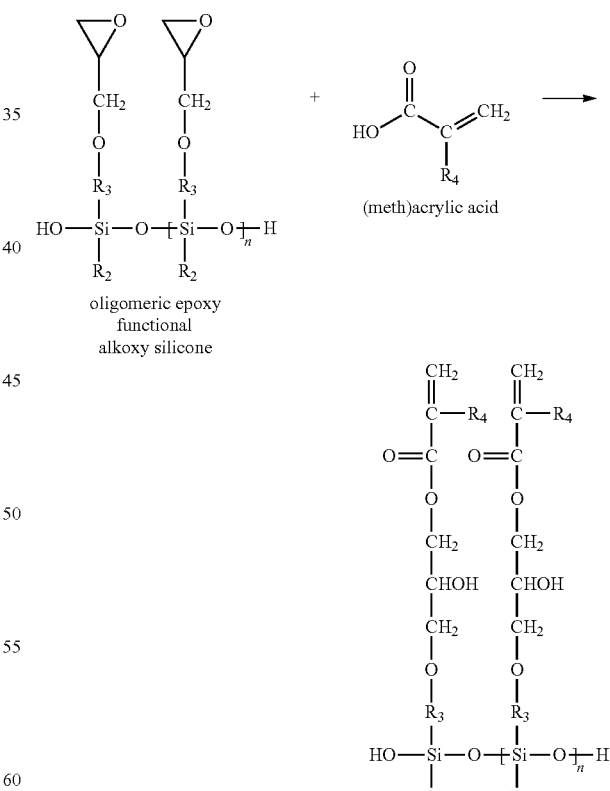

In the example presented above, the epoxy coupling groups of the oligomeric silicone react with the carboxyl group of the (meth)acrylic acid (i.e. a group with a Zerewitinow-active H-atom) by formation of an ester bridge. Thus, the oligomeric silicone is provided with one or more acrylic functionalities which may react with other monomers and/or with each other during the formation of the pressure sensitive adhesive.

In the following reaction example, an aziridinyl functionalized oligomeric silicone is reacted with the carboxyl group of the (meth)acrylic acid (i.e. a group with a Zerewitinow-active H-atom):

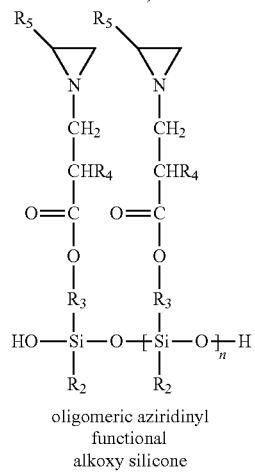
oligomeric aziridinyl functional alkoxy silicone

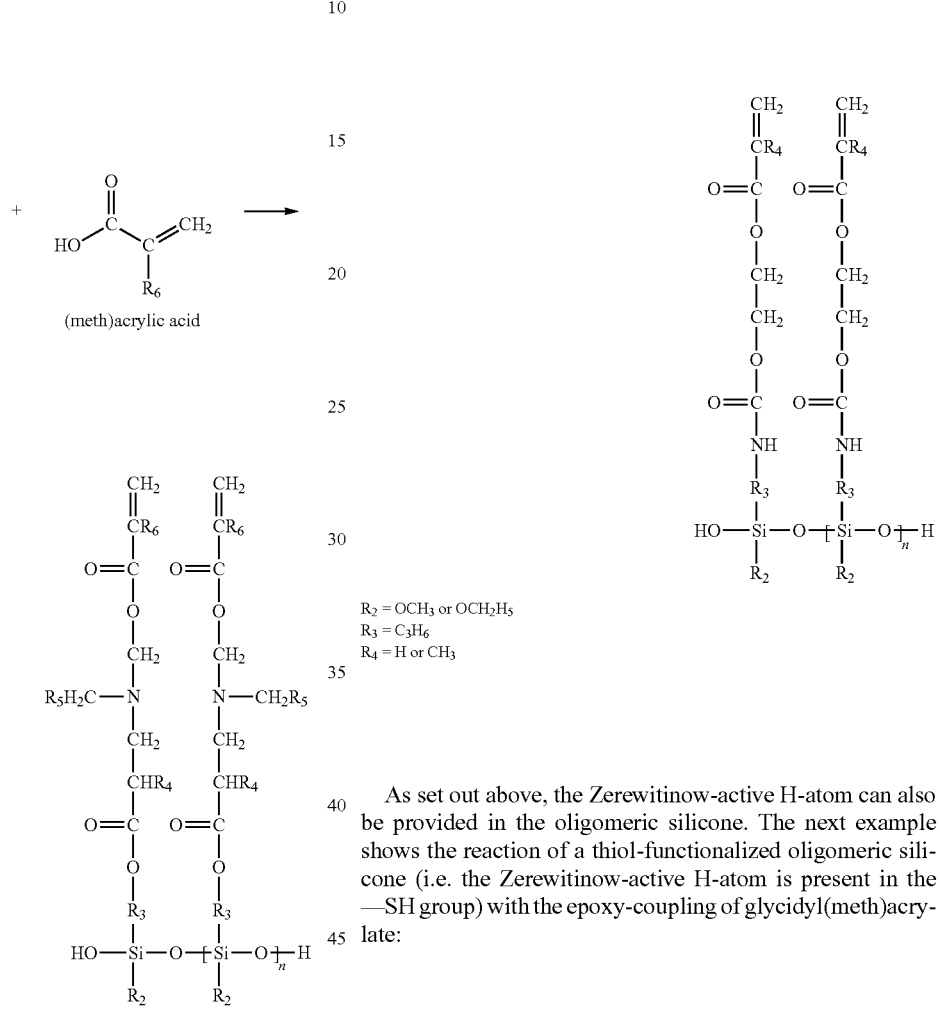

$R_2 = OCH_3$ or $OCH_2H_5$
$R_3 = C_3H_6$
$R_4 = H$ or $CH_3$
$R_5 = CH_3$
$R_6 = H$ or $CH_3$

The next example presents the reaction of an isocyanate functionalized oligomeric silicone with hydroxy(meth)acrylate, in which the Zerewitinow-active H-atom is present in the —OH group:

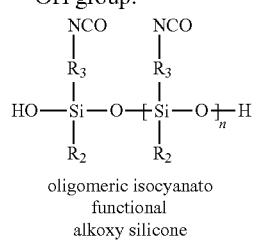
oligomeric isocyanato functional alkoxy silicone

As set out above, the Zerewitinow-active H-atom can also be provided in the oligomeric silicone. The next example shows the reaction of a thiol-functionalized oligomeric silicone (i.e. the Zerewitinow-active H-atom is present in the —SH group) with the epoxy-coupling of glycidyl(meth)acrylate:

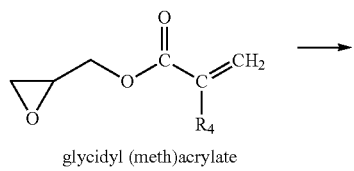

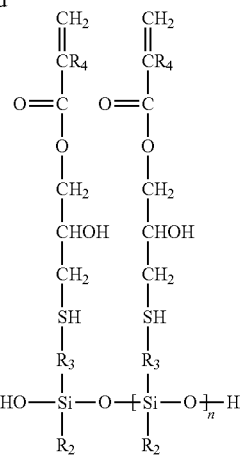

$R_2$ = OCH$_3$ or OCH$_2$H$_5$
$R_3$ = C$_3$H$_6$
$R_4$ = H or CH$_3$

Instead of a thiol group, also a secondary or primary amine group can be present in the oligomeric silicone to provide a Zerewitinow-active H-atom for the reaction with the epoxy-coupling of glycidyl(meth)acrylate:

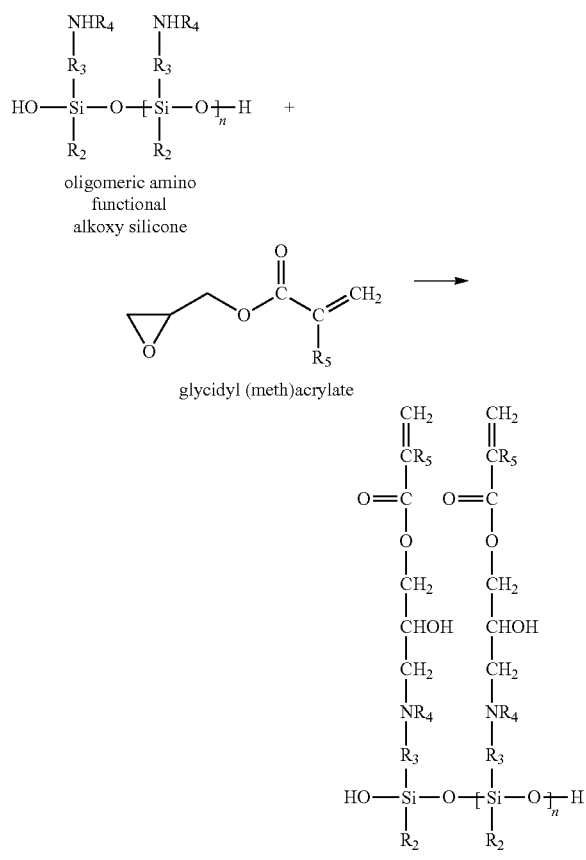

$R_2$ = OCH$_3$ or OCH$_2$H$_5$
$R_3$ = C$_3$H$_6$
$R_4$ = H or CH$_3$
$R_5$ = H or CH$_3$

These examples are just illustrative and not to be understood as limiting for the present invention.

For the PSA films of the present invention, any type of pressure sensitive adhesive may be used, like polyurethane, natural or synthetic rubber, in particular styrene-butadiene-rubber, whereas an acrylic based pressure sensitive adhesive is particularly preferred at least for the first PSA layer comprising the oligomeric silicone. The further layers of the multilayer film can also be based on acrylic pressure sensitive adhesive formulations but also other systems, depending on the desired affinity to substrate surfaces. In other words, the first PSA layer containing the oligomeric silicone allows especially good adhesion to glass surfaces whereas the opposing PSA layer can be configured to have good adhesion to a different type of substrates like metals, plastic surfaces, wood surfaces or the like.

The acrylic PSA layers are typically prepared from precursor compositions containing polymerizable acrylic monomers and/or oligomers and a photoinitiator to be cured by radiation for example. This will be discussed in more detail below. The acrylic monomers of the precursor compositions may comprise one or more strongly polar monomer, in particular from 0.1 to 20 wt.-%, preferably from 0.5 to 15 wt.-%. Polarity (i.e., hydrogen-bonding ability) is frequently described by the use of terms such as 'strongly', 'moderately', and 'poorly'. As will be further set out below, references describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol. 38, No. 496, pp. 269-280.

Although not limited to those, the strongly polar acrylate is in particular chosen from the group comprising acrylic acid, methacrylic acid, itaconic acid, hydroxyalkyl acrylates, acrylamides and substituted acrylamides or mixtures thereof.

As a further component, an acrylic precursor may contain co-monomers which preferably carry at least one ethylenically unsaturated group and are in particular selected from acrylic acid esters. The acrylic acid esters used in the present invention are especially monofunctional acrylic esters of a monohydric alcohol having from about 4 to about 18 carbon atoms in the alcohol moiety, like isooctyl acrylate, 2-ethylhexyl acrylate, isononyl acrylate, isodecyl acrylate, decyl acrylate, lauryl acrylate, hexyl acrylate, butyl acrylate, and octadecyl acrylate, or combinations thereof, from which isooctyl acrylate is mostly preferred.

The acrylic precursors may contain 50 to 99 wt.-% of such a co-monomer(s), in particular 60 to 90 wt.-%. Besides the strongly polar acrylate and the co-monomers, the precursors contain polymerization catalysts and/or initiators, like photoinitiators as well as optional components like fillers, crosslinking agents and the like.

With respect to the oligomeric organofunctional silicone, it is further preferred that the silicone has 3 to 8, especially 4 to 7 Si atoms.

With respect to the inventive PSA film, numerous silicones can be used. The Si atoms in the oligomeric silicone can be linked to each other by hydrocarbon groups, oxygen, ether groups or diether groups, just to mention some examples, which are not to be understood as limiting.

In the scope of the present invention, the oligomeric silicone can be constituted by oligomerization of a single silicone or at least two different silicones. A preferred silicone has the general Formula (I):

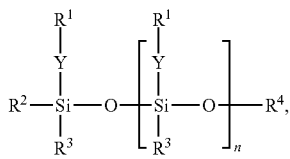

Formula (I)

wherein:
$R^1$ is an organic rest having at least one coupling group,
$R^2$ being a substituted or unsubstituted alkyl-, alkoxy- or alkenyl-group, like a methyl-, ethyl-, methoxy- or ethoxy-group, H or OH,
$R^3$ being an hydroxy-, a substituted or unsubstituted alkyl-, alkoxy- or alkenyl-group, in particular a methyl-, ethyl-, methoxy- or ethoxy-group,
$R^4$ being a substituted or unsubstituted alkyl- or alkenyl-group, like a methyl- or ethyl-group or H,
Y being a saturated or unsaturated substituted or unsubstituted hydrocarbon-di-radical and n being an integer ≥1, in particular from 1 to 9, especially 2 to 7, further preferred 3 to 6.

Other particularly suitable examples of oligomeric orga-nofunctional silicones are amino and vinyl or mercapto functional silicones.

Such an oligomeric silicone can be obtained by a condensation reaction of monomeric silanes having the desired functionality and coupling groups that allow the condensation reaction. A suitable leaving group is an alkoxy group, like methoxy or ethoxy, which is released as the respective alcohol which can continuously be removed during the reaction. The reaction can be carried out in bulk or with a solvent, whereas the solvents should be selected from chemically inert solvents like n-hexane, paraffin, toluene, xylene, ketones like acetone, methyl ethyl ketone and the like.

The oligomerization reaction can be catalyzed. Suitable catalysts include acids, bases or transition metal compositions. Suitable acids are phosphoric acid, chloroacetic acids, hydrochloric acid, sulfuric acid, p-toluenesulfonic acid and mixtures thereof, just to give some examples. Suitable bases are sodium methoxide and sodium ethoxide, whereas the transition metal compositions can be selected from titanium alkoxides, titanium-chelate complexes, zirconium alkoxides and chelates, tetraisopropyl titanate, dibutyltin dilaurate or mixtures thereof.

A particularly preferred example of an oligomeric silicone having the structure of Formula (I) is characterized in that $R_1$ comprises an epoxy group, a hydroxyl group, a primary or secondary amine group or an aziridine group as coupling group, wherein $R^2$ is in particular a hydrogen atom and/or wherein Y—$R^1$ is in particular represented by the radical of Formula (II):

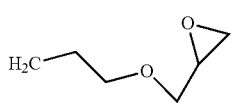

Formula (II)

In the context of this embodiment, it is further preferred that the integer n of the oligomeric silicone is 5+/−1, in other words, the oligomeric silicone has 6+/−1 Si atoms. More preferred, at least about 80 wt.-% of the oligomeric silicone has 6 Si atoms. Products of this type are commercially available from the company Momentive Performance Materials Inc. (USA).

The amount of oligomeric organofunctional silicone in the pressure sensitive adhesive may preferably ranges from 0.05 to 2 wt.-% with respect to the total pressure sensitive adhesive formulation, in particular from 0.05 to 1.5 wt.-%, preferably from 0.1 to 1 wt.-%.

In order to further enhance the bond strength on glass substrates, the first pressure sensitive adhesive layer containing the silicone may be formulated to be substantially free of filler particles, cavities in the form of microspheres, expendable microspheres, in particular pentane filled expendable microspheres or gaseous cavities.

Regarding the second opposing layer of the PSA film of this invention it is preferred that the second opposing layer contains filler particles, cavities in the form of microspheres, expendable microspheres, in particular pentane filled expendable microspheres or gaseous cavities. This is advantageous, because such a layer is capable to compensate uneven surfaces and has shock absorbing characteristics, which is especially useful, if the PSA film is used for bonding glass to a metallic or another hard surface, such as e.g. in structural glazing applications. The filler particles are typically added to the precursor before curing.

In another aspect of the inventive PSA film, the second opposing layer is a pressure sensitive adhesive layer. In order to provide pressure sensitive adhesive characteristics, any type of pressure sensitive adhesive may be used, like polyurethane, natural or synthetic rubber, in particular styrene-butadiene-rubber, whereas an acrylic based pressure sensitive adhesive is particularly preferred.

The PSA film according to the present invention has at least a first pressure sensitive adhesive layer and a second opposing layer. These layers can be either directly superimposed. Alternatively, at least one intermediate layer is present between the first pressure sensitive adhesive layer and the second layer. Such an intermediate layer is useful to further modify the characteristics of the PSA-film, especially its capabilities to compensate rough or uneven substrates or to enhance the shock absorbing capabilities of the PSA-film. For this purpose it is particularly preferred if at least one of the intermediate layers contains filler particles, cavities in the form of microspheres, expendable microspheres, in particular pentane filled expendable microspheres or gaseous cavities, glass bubbles or combinations thereof.

It is further preferred that the precursor of at least one pressure sensitive adhesive layer contains an acrylic monomer with at least one amide group, in particular N-vinylcaprolactam, N-vinylpyrrolidone, acryloxyl morpholine, N-isopropylacrylamide, diacetone acrylamide or mixtures thereof. The additions of such co-monomers may further enhance the adhesion to high energy surfaces, in particular to glass substrates, therefore it is especially preferred if these co-monomers are present in the precursor of the first pressure sensitive adhesive layer, i.e. that layer comprising the oligomeric silicone.

Besides the enhancement of the adhesion to high energy surfaces, the addition of an acrylic monomer with at least one amide group, in particular N-vinylcaprolactam allows reducing the content of strongly polar acrylates in the precursor composition. It is believed that a high content of strongly polar acrylates reduces the shelf life of the multilayer films, i.e. its adhesion to glass substrates of the layer containing the oligomeric silicone. Accordingly, it is a preferred embodiment of this invention that the precursor of the first PSA layer containing the oligomeric silicone and the acrylic monomer with at least one amide group contains 0.1 to 8 wt.-% of a strongly polar acrylate, in particular 0.1 to 6 wt.-%, preferably 0.1 to 4 wt.-% or even 0.1 to 2 wt.-%, wherein the strongly polar acrylate is especially chosen from the group comprising acrylic acid, methacrylic acid, itaconic acid, hydroxyalkyl acrylates, acrylamides and substituted acrylamides or mixtures thereof.

The intermediate layer can however also be constituted by a solid film, a web, a mesh or the like as will be further discussed below. Such an intermediate layer may be introduced to increase the tearing resistance of the tape for example.

In another aspect, the multilayer PSA film according to the present invention is further provided with a second pressure sensitive adhesive layer, which is preferably applied to the second opposing layer at the side opposite to that onto which is applied the first pressure sensitive adhesive layer.

The formulation of the second opposing layer may be tailor-made or adapted to the particular surface onto which it is meant to adhere. As such, the multilayer PSA film of the invention is highly versatile and may be used to create an efficient adhesive bonding between various similar or dissimilar surfaces, with tailor-made properties.

The multilayer PSA film of the invention may find a particularly preferred use in structural glazing applications, whereby the inventive PSA film is used for creating an effective adhesive bonding between a glass surface, such as e.g. a window glass panel, and a metallic surface, such as e.g. an aluminum or steel frame.

The multilayer PSA film of the invention may also be particularly useful in the automotive industry, where a suitable adhesive film/tape shall provide an adhesive bonding to glass surfaces with excellent initial bonding, excellent ageing behavior, as well as water and damp heat durability. The multilayer PSA film of the invention have indeed been found to provide excellent adhesive bonding to glass substrates even under stringent wet or humid conditions. The inventive multilayer PSA film may be particularly useful for the bonding of window shields, windows, windscreens to various substrates, in particular to plastic surfaces such as e.g. water boxes or water tanks.

The PSA-film of the present invention can be produced by any known method for the preparation of multilayer films with pressure sensitive adhesive capabilities on at least one of the main surfaces of the film. Examples are co-extrusion, lamination of the layers, preparing one layer and deposition of the further layer(s) for example by extrusion or from a solution.

It is however preferred to produce the inventive PSA-film, or in general a PSA film having at least one pressure sensitive adhesive surface with a silicone by a so called "wet-in-wet" process. A further object of this invention is therefore directed to a continuous self-metered process of forming a multilayer (PSA) film comprising at least two superimposed polymer layers, wherein the process comprises the steps of:
(i) providing a substrate;
(ii) providing two or more coating knives which are offset, independently from each other, from said substrate to form a gap normal to the surface of the substrate;
(iii) moving the substrate relative to the coating knives in a downstream direction,
(iv) providing curable liquid precursors of the polymers to the upstream side of the coating knives thereby coating the two or more precursors through the respective gaps as superimposed layers onto the substrate, the precursor comprising a monomer or a partially prepolymerized monomer, the monomer having a curable ethylenically unsaturated group, whereas the precursor further comprises an oligomeric organofunctional silicone having at least 2 Si atoms, in particular 2 to 10 Si atoms,
wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group,
or
wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;
with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group;
(v) optionally providing one or more solid films and applying these essentially simultaneously with the formation of the adjacent lower polymer layer, and
(vi) curing the precursor of the multilayer film thus obtained; wherein a lower layer of a curable liquid precursor is covered by an adjacent upper layer of a curable liquid precursor or a film, respectively,
whereas
at least one of said precursors has pressure sensitive characteristics after the curing step (vi) in particular the precursor comprising the oligomeric silicone.

This production process is described in detail in PCT/US 2011/022685, which full disclosure is incorporated herein by reference.

The amount of silane in the pressure sensitive adhesive may preferably range from 0.05 to 2 wt.-% with respect to the total precursor formulation.

A further object of this invention is a multilayer film obtainable by the inventive method. The multilayer film has pressure sensitive adhesive characteristics on one side or on both opposing sides. The multilayer film which is obtainable by the above method may in particular be provided with a liner, which is attached in step (v) of said method to the exposed surface of the top layer of the precursor of the multilayer film essentially simultaneously with the formation of such top layer.

Another object of this invention is an assembly comprising a substrate having a surface energy of at least 300 mJ/m$^2$, in particular a glass substrate, and a PSA film according to this invention, wherein the PSA film is attached to the substrate surface with its first pressure sensitive adhesive layer.

The present disclosure provides a cost-effective, stable continuous process of forming a multilayer film comprising at least two superimposed polymer layers which does not exhibit the shortcomings of the state-of-the-art processes or exhibits them to a lower extent only, respectively. The present disclosure also provides a method of forming a multilayer film which is versatile and flexible and allows for the easy manufacture of complex structures comprising at least two polymer layers. The present disclosure also provides a multilayer film optionally including a further layer which was initially included as a solid film into the curable precursor of the multilayer film.

Other objects of the present disclosure will be apparent to the person skilled in the art from the detailed specification of the disclosure provided below.

In the continuous self-metered coating process of the present disclosure, two or more curable liquid precursors of polymeric materials are coated onto a substrate and cured to provide a multilayer film comprising at least two superimposed polymer layers. The term superimposed as used above and below means that two or more of the layers of the liquid precursors of the polymers or of the polymer layers of the multilayer film, respectively, are arranged on top of each other. Superimposed liquid precursor layers may be arranged directly next to each other so that the upper surface of the lower layer is abutting the lower surface of the upper layer. In another arrangement superimposed liquid precursor layers are not abutting each other but are separated from each other by one or more liquid precursor layers and/or one or more solid films or webs.

The term adjacent as used above and below refers to two superimposed layers within the precursor multilayer film or the cured multilayer film which are arranged directly next to each other, i.e. which are abutting each other.

The terms top and bottom layers, respectively, are used above and below to denote the position of a liquid precursor layer relative to the surface of the substrate bearing the precursor layer in the process of forming a multilayer film. The precursor layer arranged next to the substrate surface is referred to as bottom layer whereas the precursor layer arranged most distantly from the substrate surface in a direction normal to the substrate surface is referred to as top layer. It should be noted that the terms top and bottom layer used above and below in conjunction with the description of the method of manufacturing the multilayer films do not have an unambiguous meaning in relation to the multilayer films as such. The term bottom layer is unambiguously defined in relation to the method of the present disclosure as the layer adjacent to the substrate of the coating apparatus. Likewise, the outer layer of the precursor of the multilayer film which is opposite to the bottom layer and which is applied last during the method is unambiguously referred to above and below as top layer. Contrary to this, when referring to the cured multilayer film as such, its two opposite outmost layers are termed above and below for clarity reasons as outer layers.

The terms superimposed and adjacent likewise apply to the cured polymer layers and the cured multilayer film, respectively.

The term precursor as used above and below denotes the material from which the polymers of the corresponding polymer layers of the multilayer film can be obtained by curing. The term precursor is also used to denote the stack of layers comprising at least two layers of liquid precursors from which the multilayer film of the present disclosure can be obtained by curing. Curing can be effected by curing with actinic radiation such as UV, γ (gamma) or e-beam radiation or by thermal curing.

The process of the present disclosure employs a substrate onto which the two or more layers of the liquid precursors are coated, and two or more coating knives which are offset independently from each other from the surface of the substrate receiving the precursor of the multilayer film, to form gaps normal to the surface of the substrate.

The direction into which the substrate is moving is referred to above and below as downstream direction. The relative terms upstream and downstream describe the position along the extension of the substrate. A second coating knife which is arranged in a downstream position relative to a first coating knife is also referred to above and below in an abbreviatory manner as downstream coating knife relative to the first (upstream) coating knife.

The coating knives useful in the present disclosure each have an upstream side (or surface), a downstream side (or surface) and a bottom portion facing the surface of the substrate receiving the precursor of the multilayer film. The gap is measured as the minimum distance between the bottom portion of the coating knife and the exposed surface of the substrate. The gap can be essentially uniform in the transverse direction (i.e. in the direction normal to the downstream direction) or it may vary continuously or discontinuously in the transverse direction, respectively.

The cross-sectional profile of the bottom portion of at least one of the coating knives in the longitudinal direction is designed so that the precursor layer is formed and excess precursor is doctored off. Such cross-sectional profile can vary widely, and it can be, for example, essentially planar, curved, concave or convex. The profile can be sharp or square, or it can have a small radius of curvature providing a so-called bull-nose. A hook-type profile may be used to avoid a hang-up of the trailing edge of the precursor layer at the knife edge.

The coating knives can be arranged essentially normal to the surface of the web, or they can be tilted whereby the angle between the web and the downstream surface of the coating knife preferably is between 50° and 130° and more preferably between 80° and 100°.

The bottom portion of the coating knife is preferably selected to extend at least across the desired width of the coating in a direction essentially normal to the downstream direction. The coating knife is preferably arranged opposite to a roll so that the substrate is passing between the transversely extending edge of the coating knife and the roller. Thus the substrate is supported by the roller so that the substrate is not sagging in a direction normal to the downstream direction. In this arrangement the gap between the coating knife and the surface of the substrate can be adjusted precisely.

If the coating knife is used in an unsupported arrangement, the substrate is held in place by its own tension but may be sagging to some extent in a direction normal to the downstream direction. Sagging of the substrate can be minimized by arranging the coating knife over a short span of the substrate between adjacent rollers. If a continuous substrate is used, sagging can be further minimized by guiding it over an endless conveyor belt. Another option to avoid/minimize sagging is guiding the substrate over a rigid surface.

The coating knives useful in the present disclosure are solid, and they can be rigid or flexible. They are preferably made from metals, polymeric materials, glass or the like. Flexible coating knives are relatively thin and preferably between 0.1 and 0.75 mm thick in the downstream direction and they are preferably made of flexible steels such as stainless steel or spring steel. Rigid coating knives can be manufactured of metallic or polymeric materials, and they are usually at least 1 mm, preferably at least 3 mm thick. A coating knife can also be provided by a continuously supplied polymer film which is tensioned and appropriately deflected by rollers, bars, rods, beams or the like to provide a transversely extending coating edge facing the substrate. If desirable, the polymer film can simultaneously be used as a release liner or as a solid film incorporated into the precursor of the multilayer film.

In the present disclosure a lower layer of a curable liquid precursor (i.e. any layer different from the top layer) is coated with an adjacent upper layer of a curable liquid precursor or a solid film, respectively, essentially from its onset. Thus, the lower curable liquid precursor layer is directly covered by the adjacent upper layer of a curable liquid precursor layer or by the solid film, respectively.

A solid film is preferably applied along the upstream side of the coating knife which also provides the lower layer of a curable liquid precursor. The film is thus attached to the upper surface of the lower layer essentially during the formation of said layer and the lower layer is not exposed. Directly depositing an upper layer of a curable liquid precursor onto the upper surface of said lower layer without exposing such upper surface of the lower layer can be accomplished by appropriately arranging the two coating knives forming the two layers. In one embodiment, the liquid precursors are applied via two coating stations abutting each other in the downstream direction whereby the back walls of the coating chambers comprise or form, respectively, the coating knives. The lower layer when formed by the corresponding coating knife is thus directly covered with the curable liquid precursor of the upper layer contained in the corresponding coating chamber. Generally the coating knife forming the upper layer needs to be arranged so that the lower layer, upon its formation at the corresponding coating knife, is essentially directly covered with the curable liquid precursor forming the upper layer.

In another embodiment, a solid film such as, in particular, a release liner is applied to the exposed surface of the top layer essentially simultaneously with the formation of such top layer. The solid film can be applied, for example, along the upstream surface of the most downstream coating knife (i.e. the back wall) of the coating apparatus. In this embodiment the solid film is smoothly attached to the exposed surface of the top layer in a snug fit thereby avoiding a compression of the top layer or the multilayer stack, respectively, or the inclusion of air between the solid film and the exposed surface of the top layer.

Although the present inventors do not wish to be bound by such theory, it is speculated that the above deposition of a solid film or of the liquid precursor forming the adjacent upper layer, respectively, onto the lower liquid precursor layer essentially simultaneously with the formation of the lower layer by means of coating knives results in multilayer films characterized by superior properties. The multilayer films of the present disclosure exhibit well-defined layers. Due to the wet in wet production, in which mostly uncured compositions are superimposed, diffusion of in particular smaller monomers like acrylic acid can occur at the interface between adjacent layers. It is further believed that the inventive PSA films develop chemical bonds extending from one layer to the adjacent layer which might possibly be even more pronounced by monomer diffusion across the interface. This might be an explanation for the strong anchorage observed between adjacent layers so that the films of the present disclosure typically exhibit a higher T-peel strength than corresponding films of the prior art obtained by co-extrusion of the corresponding layers and post-curing.

In an embodiment of the present disclosure, the precursor of the multilayer film is obtained by using a coating apparatus comprising one or more coating stations. The coating stations may comprise one or more coating chambers and, if desired, a rolling bead upstream to the most upstream coating chamber. The coating chambers each have an opening towards the substrate moving beneath the coating chambers so that the liquid precursors are applied as layers superimposed onto each other. The liquid precursor of the rolling bead is applied, for example, via the upstream surface of the most upstream coating knife.

The coating chambers each have an upstream wall and a downstream wall preferably extending essentially transversely with respect to the downstream direction. The most upstream wall of the coating apparatus is also referred to as front wall and the most downstream wall as back wall of the coating apparatus, respectively. In case two or more coating chambers are present, the downstream wall of an upstream coating chamber preferably is in an essentially abutting arrangement with the upstream wall of the adjacent downstream coating chamber. This means that the distance between the downstream wall of an upstream coating chamber and the upstream wall of the adjacent coating chamber preferably is less than 2.5 mm, more preferably less than 1 mm and especially preferably there is no distance at all between these walls. In a particular embodiment, the downstream wall of an upstream coating chamber and the upstream wall of the adjacent downstream coating chamber are integrated into one wall which is referred to above and below as an intermediate wall.

The downstream walls each comprise a coating knife facing the substrate. The coating knives are arranged above the exposed surface of the substrate onto which the liquid precursors are attached thereby providing for clearance between the bottom portion of the coating knife facing the substrate and the exposed surface of the substrate or the exposed layer of the liquid precursor or precursors attached previously, respectively. The distance between the bottom portion of the coating knife and the surface of the substrate as measured in a direction normal to the surface of the substrate is referred to above and below as gap. The liquid precursors are supplied from the coating chamber to the upstream side of the respective coating knife. The gap between the coating knife and the surface of the substrate is adjusted to regulate the thickness of the respective coating in conjunction with other parameters including, for example, the speed of the substrate in the downstream direction, the thickness normal to the substrate of the liquid precursor layers or solid films, respectively, already applied, the viscosity of the liquid precursor to be applied through the respective gap, the viscosity of the liquid precursor(s) already applied, the kind, form and profile of the coating knife, the angle with which the coating knife is oriented relative to the normal of the substrate, the position of the knife along the extension of the coating apparatus in the downstream direction and the kind of the substrate.

The coating knife can be a separate element attached to the respective downstream wall or it can form the downstream wall, respectively. It is also possible that one or more downstream walls are provided as solid films such as release films.

The knife profile can be optimized for a specific liquid precursor supplied through a coating chamber by using a rotatable coating knife device equipped with several coating knives having a different knife profile. The person skilled in the art can thus quickly change the coating knives used as back wall, front wall or intermediate walls, respectively, in the different coating chambers and evaluate the optimum sequence of coating knife profiles in a coating apparatus for manufacturing a specific multilayer film.

If the coating apparatus useful in the present disclosure comprises only one coating chamber both the upstream wall and the downstream wall of the coating chambers comprise or form, respectively, coating knives. The liquid precursor can be supplied to the upstream edge of the front wall, for example, by means of a so-called rolling bead, or it can be supplied by any kind of hopper.

If the coating apparatus of the present disclosure comprises two or more coating chambers, the front wall may or may not form a coating knife. If the front wall does not form a coating knife it may be arranged so that there is essentially no gap between the transverse extension of the bottom portion of the front wall facing the substrate and the exposed surface of the substrate so that an upstream leakage of the liquid precursor is reduced and/or minimized. If the front wall is a coating knife, the profile of its bottom portion may be formed so that an upstream leakage of the liquid precursor contained in the first upstream coating chamber is suppressed. This can be achieved, for example, by using an essentially radius type profile of the transversely extending edge of the front wall facing the substrate.

The coating cambers each have a downstream wall, an upstream wall and two or more side walls essentially extending in the downstream direction, whereby the downstream wall of an upstream chamber and the upstream wall of an adjacent downstream chamber may be integrated into one intermediate wall. The cross-section of the coating chambers in the downstream direction can vary broadly and can be, for example, square, rectangular, polygonal or regularly or irregularly curved. The downstream wall, upstream wall and/or the side walls may be present as separate elements but it is also possible, for example, that a coating chamber is formed as one piece or that the upstream walls and the side walls, for example, are formed as one piece separate from the downstream wall coating knife. It is generally preferred that the downstream wall is a separate element or piece so that the coating knives representing the downstream wall can be easily replaced, for example, by means of a revolvable coating knife device. In case the coating apparatus comprises two or more coating chambers their respective cross-sections are preferably selected that adjacent coating chambers can be arranged in an essentially abutting configuration in the downstream direction. The upstream walls and the downstream walls of the coating chambers preferably are essentially straight in the direction transverse to the downstream direction.

The extension of a coating chamber in the downstream direction, i.e. the distance between the front wall and the back wall of a coating chamber is preferably between 2 mm and 500 mm and more preferably between 5 and 100 mm. Although the present inventors do not wish to be bound by such theory. it is speculated that if the distance between the front wall and the back wall is too small the flow of the liquid precursor towards the gap tends to become instable which results in undesirable coating defects such as, for example, streaks or "brushmarks". If the distance between the front wall and the back wall of the coating chamber is too large, the continuous flow of the liquid precursor towards the gap may rupture so that the continuous coating of the moving substrate may cease and/or mixing might occur. The flow pattern in a coating chamber or trough is discussed in more detail in U.S. Pat. No. 5,612,092, col. 4, ln. 51 to col. 5, ln. 56. This passage is incorporated by reference into the present specification.

The volume of the coating chambers is defined by their respective cross-section parallel to the surface of the substrate and their respective height normal to the surface of the substrate. The height of the coating chambers preferably is between 10 and 1,000 mm and more preferably between 25 and 250 mm. The volume of the coating chambers is preferably selected as a function of the coating width transverse to the downstream direction.

The coating chambers may be fitted with heating or cooling means so that the viscosity of the liquid precursors can be controlled and adjusted if necessary.

The liquid precursors are preferably applied under ambient pressure so that the volume flow of the precursors mainly results from the shear forces acting on the precursors as a result of the movement of the substrates and, optionally, of the solid films or webs introduced into the precursor multilayer film. The volume flow of the liquid precursors is supported by the hydrostatic pressure of the precursor comprised in the respective coating chamber. It is preferred in the method of the present disclosure that the force resulting from the hydrostatic pressure is low in comparison to the drag force or forces exerted by the moving substrate and, optionally, moving solid films. The height of the liquid precursor in a coating chamber is preferably controlled so that such height corresponds to at least the width of the coating chamber in the downstream direction throughout all of the coating process. If the height of the liquid precursor in a coating chamber is less than the width of the coating chamber in downstream direction partial mixing of the precursor applied through such coating chamber with an adjacent lower precursor layer may occur. The height of the liquid precursor in the respective coating chamber is preferably kept essentially constant.

It is also possible that the coating chambers are pressurized with air or an inert gas such as nitrogen or argon. The coating apparatus may be equipped so that the coating chambers may be pressurized separately and individually which may be desirable, for example, to counterbalance differences in viscosity between the different liquid precursors or differences in height of the liquid precursor column in the coating chambers. Preferably, the coating chambers are not completely filled with the respective liquid precursor so that the liquid precursor is pressurized via a gas atmosphere arranged on top of the liquid precursor. The total over-pressure exerted onto the respective liquid precursor is selected so that the process continues to run in a self-metered fashion, i.e. so that there is no inverse proportionality between the wet coating thickness of a precursor layer and the downweb speed of the substrate. The total over-pressure exerted onto the respective liquid precursor preferably is less than 0.5 bar and more preferably not more than 0.25 bar. In an especially preferred embodiment no gas over-pressure is applied, i.e. the process of the present disclosure is preferably run under ambient conditions.

The substrate is moved relatively to the coating knives in the downstream direction to receive a sequence of two or more layers of the liquid precursors which are superimposed onto each other in a direction normal to the downstream direction.

The substrate can be a temporary support from which the multilayer film is separated and removed subsequent to curing. When used as a temporary support the substrate preferably has a release coated surface adapted to allow for a clean removal of the cured multilayer film from the substrate. It may be desirable that the substrate when providing a temporary support remains attached to the multilayer film when winding it up, for example, for storage. This is, for example, the case if the bottom layer of the multilayer film is an adhesive layer such as a pressure-sensitive adhesive layer. The release-coated substrate protects the surface of the pressure-sensitive adhesive layer, for example, from contamination and allows the multilayer film to be wound up into a roll. The temporary substrate will then only be removed from the multilayer film by the final user when attaching the multilayer film to a surface, for example. In other embodiments where the surface of the first layer of the multilayer film facing the substrate does not need to be protected, the substrate providing a temporary support may be removed and wound up subsequent to curing the precursor layers and prior to storing the multilayer film. In another embodiment, the substrate providing a temporary support may be provided by an endless belt preferably having an exposed release surface. The multilayer film obtained after curing the stack of layers of liquid precursors separates from the endless belt and can be wound up, for example.

Alternatively, the substrate can be integrated as a layer into the resulting multilayer film. In such case, the substrate is continuously fed as a film or web and collected as a part of the multilayer film subsequent to the curing of the liquid precursor layers. The surface of the substrate may preferably be subjected, for example, to a corona treatment to enhance the anchoring of the cured bottom polymeric layer to the substrate. Anchoring of the bottom polymeric layer to the substrate may also be improved by applying a so-called tie layer onto the surface of the substrate prior to coating the bottom liquid precursor layer to the substrate. Tie layers which are suitable in the present disclosure include, for example, 3M Primer 4297, a polyamide based primer commercially available from 3M Co. or 3M Primer 4298, a primer comprising an acrylic polymer and a chlorinated polyolefin as active substances which is commercially available from 3M Co.

Substrates which are suitable both as temporary substrates or as substrates for incorporation into the multilayer film, respectively, can be selected from a group comprising polymeric films or webs, metal films or webs, woven or non-woven webs, glass fibre reinforced webs, carbon fibre webs, polymer fibre webs or webs comprising endless filaments of glass, polymer, metal, carbon fibres and/or natural fibres. Depending on the nature of the liquid precursor applied as a bottom layer onto the substrate and on whether the substrate is used as a temporary support or as an integral layer of the multilayer film, the person skilled in the art can decide without any inventive input whether a treatment of the substrate surface is required or desirable. It was found by the present inventors that the method of the present disclosure is relatively insensitive to the roughness of the exposed surface of the substrate. The surface roughness can be characterized by the arithmetic average surface roughness $R_a$ which can be measured, for example, by laser profilometry. Polymeric films suitable for use in the present disclosure may have $R_a$ values of, for example, 1-20 µm or more preferably of 1-10 µm whereas non-woven webs may have $R_a$ values of between 10 and 150 µm and more preferably between 15 and 100 µm. The multilayer films obtainable by the method of the present disclosure exhibit, essentially independent of the surface roughness $R_a$ of the substrate, a bottom polymer layer with a homogenous thickness along the extension of the web in the downstream direction. The average deviation of the thickness of the bottom polymer layer in a direction normal to the downstream direction preferably is over an arbitrarily selected distance of 10 mm less than 10%, more preferably less than 5% and especially preferably less than 2.5%.

If the substrate is used as a temporary support its optionally release treated surface facing the coating knives preferably is essentially impermeable with respect to the liquid precursor applied to the substrate.

If the substrate forms an integral part of the multilayer film subsequent to curing the precursor of the multilayer film, it is also desirable that the optionally treated surface of the substrate is essentially impermeable with respect to the bottom precursor layer or that the bottom liquid precursor does at least not migrate to the opposite surface of the substrate prior to curing, respectively. In case of substrates having a certain porosity such as, for example, non-woven substrates or paper it may be desirable that the liquid precursor penetrates into the surface area into the bulk of the substrate, respectively, so that the interfacial anchorage between the first polymer layer and the surface of the substrate is improved. The penetration or migration behavior of the liquid precursor relative to a given substrate can be influenced, for example, by the viscosity of the liquid precursor and/or the porosity of the substrates.

The thicknesses of the liquid precursor layers normal to the substrate are mainly influenced by the gap between the bottom portion of the coating knife and the surface of the substrate, the respective viscosities of the liquid precursors and the downstream speed of the substrate.

Besides the liquid precursor layers provided through the recess, the thickness of the liquid precursor layers preferably is independently of each other between 25 µm and 3,000 µm, more preferably between 75 µm and 2,000 µm and especially preferably between 75 µm and 1,500 µm. The desirable thickness of a coating layer depends, for example, on the nature of the liquid precursor and the resulting cured polymer layer.

The gap width required to provide a desired value of the thickness of the precursor layer depends on various factors such as the profile of the coating knife, the angle of the coating knife normal to the substrate, the downstream speed of the substrate, the number of layers of liquid precursors to be coated, the absolute values of the viscosities of the liquid precursors and the ratio of the absolute values of the viscosity of a specific precursor with respect to the absolute viscosity values of the liquid precursor present in adjacent layers. Generally, the gap width needs to be larger than the desired thickness of the respective layer of the liquid precursor regulated by such gap. It is disclosed, for example, in Kirk-Othmer, Encyclopedia of Chemical Technology, $4^{th}$ ed., ed. by J. Kroschwitz et al., New York, 1993, vol. 6, p. 610, as a rule of thumb that the thickness of the liquid precursor layer obtained by means of a coating knife arranged normal to the substrate and having a transversely extending bottom portion with a square profile arranged in parallel to the substrate is about half the width of the gap for a wide range of substrate speeds.

The gap width is measured in each case as the minimum distance between the bottom portion of the coating knife facing the substrate and the exposed surface of the substrate. The gap is preferably adjusted to a value between 50 µm and 3,000 µm and more preferably between 100 µm and 2,500 µm.

The Brookfield viscosity of the liquid precursors at 25° C. preferably is between 100 and 50,000 mPa·s, more preferably between 500 and 30,000 mPa·s and particularly preferred between 500 and 25,000 mPa·s. If the liquid precursor comprises solid particles such as, for example, pigments or thermally and/or electrically conducting particles, the viscosity of the liquid precursor preferably is between 1,000 and 30,000 mPa·s and more preferably between 3,000 and 25,000 mPa·s.

It was found by the present inventors that liquid precursors having a lower Brookfield viscosity can be coated faster and thinner. If a layer thickness of the liquid precursor of less than 500 µm is required, the Brookfield viscosity of the liquid precursor preferably is less than 15.000 mPa·s and more preferably between 500 mPa·s and 12.500 mPa·s.

If the viscosity of the liquid precursor is less than about 100 mPa·s, the coated layer tends to get unstable and the thickness of the precursor layer may be difficult to control. If the viscosity of the liquid precursor is higher than about 50.000 mPa·s, coating of homogeneous films tends to get difficult due to high shear forces induced by the high viscosity. If the liquid precursor comprises curable monomers and/or oligomers the viscosity of the precursor may be increased in a controlled way within the ranges given above by partially polymerizing the precursor to provide a desirable coatability. Alternatively, the viscosity of the liquid precursor may be increased and adjusted by adding thixotropic agents such as fumed silica and/or polymer adds such as block-copolymers (SBRs, EVAs, polyvinylether, polyalphaolefins), silicones or acrylics. The viscosity of the liquid precursor may also be decreased, for example, by increasing the amount of curable monomers and/or oligomers.

It was found that, within a stack of liquid precursor layers, the absolute and/or relative thickness of a first upper layer of a liquid precursor having a first Brookfield viscosity at 25° C. is typically increased with increasing downstream speed of the substrate in comparison to the absolute and/or relative thickness of a second layer of a liquid precursor which is adjacent to the first layer and the precursor of which has a second Brookfield viscosity at 25° C. which is lower than that of said first precursor. The term relative thickness of a specific liquid precursor layer is defined as the ratio of the thickness of this precursor layer over the thickness of the completed stack of liquid precursor layers prior to curing, i.e. the thickness of the precursor multilayer film.

It was furthermore found that the ratio of the Brookfield viscosities of the liquid precursors of an upper liquid precursor layer and a lower, adjacent liquid precursor layer within a stack of precursor layers preferably is between 0.1 and 10 and more preferably between 0.2 and 7.5. It was found that if such ratio is outside of these preferred ranges the thicknesses of such liquid precursor layers may become inhomogenous in the downstream direction.

The downstream speed of the substrate preferably is between 0.05 and 100 m/min, more preferably between 0.5 and 50 m/min and especially preferably between 1.5 and 50 m/min. If the downstream speed of the substrate is less than 0.05 m/min the flow of the liquid precursors towards the gap becomes slow and instable resulting in coating defects. If the downstream speed of the substrate is higher than 100 m/min turbulences might occur at the interfaces between the precursor layers which may, depending on the viscosity and rheology of the precursors, result in uncontrolled mixing and/or coating defects.

It was found by the present inventors that for a specific viscosity of a liquid precursor the quality of the coating may unacceptably deteriorate if the downstream speed of the substrate is selected too high. The deterioration in quality may be reflected in the entrainment of air bubbles or in the occurrence of a streaky and non-uniform coating. The coating speed is preferably adapted so that all liquid precursor layers in a stack of such layers are coated uniformly and with a high quality, i.e. the most speed-sensitive layer determines the overall downstream speed. If the downstream speed of the substrate is selected too low, a reduction of the layer thickness may not be achievable by the reduction of the corresponding gap width only but may also require an increase of the downstream speed. It was furthermore found by the present inventors that the downstream speed of the substrate is preferably selected between the maximum and minimum values specified above. In such downstream speed interval the thickness of the liquid precursor layers is relatively insensitive to variations of the downstream speed so that the thickness of the liquid precursor layer can be majorly regulated by the gap width.

The liquid precursors suitable in the present disclosure comprise a broad range of precursors which can be cured by exposure to actinic radiation and, in particular, to UV-radiation, gamma-radiation and E-beam or by exposure to heat. The liquid precursors are preferably light-transmissive to visible light. In a preferred embodiment the precursors used in the multilayer film of the present disclosure are select so that a cured single film of the precursor having a thickness of 300 μm exhibits a transmission of at least 80% relative to visible light (D65) as measured according to the test method specified in the test section below. The precursor used in the multilayer films of the present disclosure more preferably exhibit when present as a single 300 μm thick cured film a transmission of at least 90% and especially preferably of at least 95%.

The light-transmission of the multilayer film relative to visible light which results from the light transmission of the superimposed polymer layers preferably is at least 80%, more preferably at least 85% and especially preferably at least 90%.

Precursors the curing of which does not include the release of low molecular weight condensate molecules such as water or alcohol molecules or includes such release only to a low amount, are usually preferred because the condensate molecules of non-exposed liquid precursor layers can typically not be fully discharged from the multilayer film.

The method of forming multilayer films of the present disclosure is highly versatile and allows for making a broad range of multilayer films with tailor-made properties.

While the present inventors do not wish to be bound by such considerations, it is speculated that the method of the present disclosure establishes a high quality laminar flow regime which is not accessible by prior art methods.

In contrast to the pre-metered die coating methods for making multilayer films which are disclosed in the prior art, the process of the present disclosure is a self-metered process wherein the flow of the liquid curable precursors mainly results from shear forces. These are provided by the substrate or the layers already attached to it moving in the downstream direction thereby exerting a drag flow onto the respective liquid precursor. Shear forces are also provided by the solid film or films, respectively, if present, moving initially along the upstream side of the coating knife towards the substrate and then, after being deflected at the transversely extending edge of the coating knife, parallel to the substrate in the downstream direction. It is believed that the volume flow resulting from these shear forces is essentially laminar and stable and that any turbulences which might occur, for example, when forming the liquid precursor layers at the respective gaps, are effectively dampened by essentially simultaneous applying the liquid precursor layers and, optionally, the solid film or films onto each other. The essentially simultaneous application of an upper adjacent liquid precursor onto a lower liquid precursor layer is preferably provided by arranging the coating knives appropriately. The essentially simultaneous application of an adjacent upper solid film, if present, is preferably provided by guiding such film along the upstream surface of the coating knife forming the lower precursor layer.

In the pre-metered die coating processes for making multilayer films, the volume flow rate that is provided by the metering pump equals the flow rate that exits the die. Therefore such flow rate is essentially constant independently of the downweb speed of the substrate so that the thickness of a precursor layer coated onto the substrate or a preceding precursor layer, respectively, is essentially inversely proportional to the downweb speed of the substrate. Contrary to that, in the self-metered coating process of the present disclosure the volume flow rate applied via the respective coating knife to the web is not constant but varies with the web speed and the wet thickness of a coated precursor layer is mainly influenced by the interactions of the liquid precursor flow with the coating apparatus of the present disclosure (cf. S. F. Kistler et al., Liquid Film Coating, loc cit., p. 10, bottom of left col. and chapters 12 and 13). In the present disclosure the volume flow rate tends to increase with increasing web speed so that there is no inverse proportional relationship between the wet film thickness and the downweb speed of the substrate. The self-metered process of the present disclosure is furthermore characterized by the presence of an excess of the liquid precursors in the respective coating chambers which is metered by the coating knife to the moving web. In contrast to that pre-metered die coating processes are characterized by a constant volume flow so that what is conveyed by the pump is also applied to the moving web. Thus the self-metered process of the present disclosure is fundamentally different from the pre-metered die coating process used in the prior art.

The multilayer films obtainable by the method of the present disclosure preferably exhibit essentially homogenous properties such as, for example, an essentially homogenous thickness of the cured polymer layers in the transverse direction. It is speculated by the present inventors that the stable flow pattern established by the shear force regime of the present disclosure results in a flow history of the liquid precursors which is essentially constant over the coating width for all precursors. The average deviation of the thicknesses of the cured layers of the multilayer film in a direction normal to the downstream direction preferably is over an arbitrarily selected distance of 10 mm less than 5%, more preferably less than 2.5% and especially preferably less than 2%. Due to the use of a bottleneck, the before mentioned uniformity can also be achieved with this layers of 300 µm, 200 µm, 100 µm or even thinner layers.

In the method of the present disclosure the volume flow mainly resulting from the shear force regime is mainly controlled by the gaps between the respective coating knives and the substrate, the arrangement of the coating knives relative to each other, the geometry of the bottom portion of the coating knives, the speed of the substrate and the viscosity of the curable liquid precursors. These parameters are easy to control and can be varied widely without adversely affecting the stable flow pattern which is essentially laminar and essentially homogenous in the transverse direction. In the process of the present disclosure the gaps between the respective coating knives and the substrate can be changed and adjusted in a wide range while the coating process is running. The process of the present disclosure is thus more versatile and easy to handle in comparison to the pre-metered die coating processes for multilayer stacks of wet precursor layers of the state of the art.

The method of the present disclosure provides novel multilayer films with unique properties and, in particular, with preferred optical properties such as, in particular, a high optical transmission for visible light. While the present inventors do not wish to be bound by such theory it is speculated that this is resulting from a micro-diffusion taking place at the interface between adjacent layers.

The extent of such micro-diffusion is believed to be on the one hand small enough so that it does not affect the integrity of adjacent layers. This can be demonstrated, for example, by adding a dye to one of a pair of adjacent cured layers while not adding a dye to the other cured layer. Cross-sectional microphotos from such multilayer films preferably show a sharp transition from the dyed layer to the non-dyed layer, and the interface preferably is not blurred.

The extent of such micro-diffusion is believed to be on the other hand large enough to provide a micro-gradient at the interface which results, for example, in a gradual transition between the refractive indices of adjacent layers and hence in an increased transmission. The appearance of the interface between two adjacent liquid precursor layers and hence the extent of the micro-diffusion can mainly be influenced by the viscosity of the liquid precursors of the two adjacent precursor layers. The interfacial area between two adjacent precursor layers typically is the more sharp-edged the higher the viscosity of the two liquid precursors. It is believed that interfacial micro-diffusion or micro-mixing can be enhanced by decreasing the Brookfield viscosity of at least one of the precursors of the adjacent layers to less than 5,000 mPa·s, more preferably less than 2,500 mPa·s and especially preferably to from 500-1,500 mPa·s. The interfacial micro-diffusion is believed to be further enhanced when the liquid precursors of both adjacent layers exhibit, independently from each other, a Brookfield viscosity of less than 5,000 mPa·s, more preferably of less than 2,500 mPa·s and especially preferably of between 500-1,500 mPa·s.

The micro-diffusion is also believed to increase the bonding strength between adjacent layers of the multilayer film upon curing which is reflected, for example, in improved mechanical properties such as an increased T-peel strength.

The top cured polymer layer of the multilayer film preferably exhibits an excellent finish of its exposed surface, i.e. low surface roughness as evaluated, for example, in terms of the surface roughness $R_z$.

The unique properties of the method of the present disclosure are reflected in the properties of multilayer films obtainable by such method and of assemblies comprising such multilayer films, respectively. A preferred assembly of the present disclosure comprises a light-transmissive multilayer film obtainable by the method of the present disclosure and a glass substrate. The multilayer film used in such assembly is attached through an outer adhesive layer to the glass substrate wherein the superimposed polymer layers of the multilayer film each have a transmission of at least 80% relative to visible light and wherein the refractive index of the adhesive layer is lower than the refractive index of the opposed outer layer. The transmission of the polymer layers relative to visible light is measured according to the test method specified in the test section below for cured single precursor layers having a thickness of 300 µm each. The precursor layers used in the multilayer films of the present disclosure more preferably exhibit when present as a single 300 µm thick cured film a transmission of at least 90% and especially preferably of at least 95%. The light-transmission of the multilayer film relative to visible light which results from the light transmission of the superimposed polymer layers preferably is at least 80%, more preferably at least 85% and especially preferably at least 90%. If desired the multilayer film may comprise light-transmissive solid films such as, for example, light-transmissive polymer films or webs. It was found that assemblies with an advantageous transmission relative to visible light are obtained if the refractive index of the outer adhesive layer attached to the glass substrate is lower than the refractive index of the opposite outer layer. This requirement is counterintuitive and it is believed to be based on the interfacial micro-diffusion described above. The glass substrate can be selected from conventional silica based glasses such as, for example, float glass but also from polymer glasses such as, for example, acrylic glass, polycarbonate glass or polyethylene terephthalate glass. The refractive index of glasses suitable in the present disclosure $n_{589\,nm, 23°\,C.}$ preferably is between 1.48 and 1.52.

When manufacturing the multilayer film useful in the above assembly the adhesive layer may preferably be coated as the top layer (which is attached to the surface of the glass substrate in the assembly and thus forms a non-exposed outer layer of the multilayer film) and covered, for example, with a release liner whereas the opposite outer layer is preferably coated as the bottom layer (which forms the outer layer of the assembly opposite to the adhesive layer). It is, however, also possible that the adhesive layer of the multilayer film used in the assembly is coated as the bottom layer during the method; in such case the substrate preferably is integrated into the multilayer film and forms a release liner attached to the adhesive layer. In the above assembly the difference between the refractive indices of the two outer layers (=outer layer opposite to adhesive layer and adhesive layer, respectively) preferably is less than 0.030. More preferably, the outer adhesive layer of the multilayer film has a refractive index $n_{589n, 23° C.}$ which is not more than 0.0025, more preferably not more than 0.0020, especially preferably not more than 0.0015, highly preferably not more than 0.0010 and most preferably not more than 0.0008 lower than the refractive index $n_{589n, 23° C.}$ of the opposed outer layer. In such films the transmission is measured according to the test method specified in the test section below for single precursor layers having a thickness of 300 μm each. The transmission is at least 80%, more preferably at least 90% and especially preferably at least 95% for each cured layer. In a more preferred embodiment the refractive indices of precursor layers arranged between the two outer layers, if present, is larger than the refractive index of the outside adhesive layer and smaller than the refractive index of the opposite outside layer. The refractive indices are measured at a wavelength of 589 nm and a temperature of 23° C. as is described in the test section below.

The method of the present disclosure furthermore allows for the incorporation of solid films such as polymeric films or webs, metal films or webs, woven or non-woven webs, glass fibre reinforced webs, carbon fibre webs, polymer fibre webs or webs comprising endless filaments of glass, polymer, metal, carbon fibres and/or natural fibres. In a coating apparatus containing one or more coating chambers such solid films can be introduced along the upstream surface of the front wall, any intermediate wall and the back wall, respectively.

If the solid film is a release liner, this may be arranged beneath the bottom precursor layer or on top of the top layer of the multilayer film to protect the exposed surfaces of the bottom and top precursor layers, respectively. A release film when included into the multilayer film as an intermediate layer between the bottom and the top polymer layer, respectively, introduces a predetermined breaking surface into the multilayer film. This can be used, for example, to prepare a stack of multilayer films in a single production process from which the individual multilayer films can be easily obtained by peeling along the release surface.

Solid films other than release liners form an integral part of the cured multilayer film. The solid films are also referred to as backing in the cured multilayer film.

In one embodiment, multilayer films of the present disclosure comprise at least two superimposed polymer layers obtainable by the method of the present disclosure wherein a release liner is applied to the exposed surface of the top layer of the precursor essentially simultaneously with the formation of such layer. This is preferably achieved by guiding and applying the release liner via the upstream surface of the most downstream coating knife, i.e. the upstream surface of the back wall of the coating apparatus. In an alternative embodiment, the back wall can be provided by the release liner which is suitably tensioned and deflected by rollers, rods, bars, beams or the like to provide a transversely extending edge facing the substrate. In this case the additional back wall can be omitted.

Since the release liner is applied to the exposed surface of the top liquid precursor layer essentially simultaneously with the formation of such layer it is smoothly attached to the top layer in a snug fit without exerting too much pressure or insufficient pressure, respectively, during the application of the liner. Since the liner is arranged in a snug fit the formation of voids between the liner and the surface of the liquid layer is essentially avoided. Likewise, since the release liner is applied along the upstream surface of the coating knife forming the liquid layer the liner is smoothly attached to the surface of the liquid layer essentially without creating turbulences in the liquid layer and the like. Therefore the problems encountered when attaching the liner to the exposed surface of a liquid layer subsequently to the formation of said liquid layer in a die-coating process of the state of the art can be widely avoided or at least diminished in the process according to the present disclosure. This is a unique advantage of the process of the present disclosure which translates into superior properties of multilayer films being obtainable by the method of the present disclosure wherein a release liner is attached to the exposed surface of the top layer of the precursor essentially simultaneously with the formation of said layer and subsequent curing. If desired the release liner can be subsequently removed.

In prior art methods of making multilayer films a release liner, if present, was typically applied to the exposed surface of the top precursor layer subsequent to the formation of such layer. In such methods the release liner was laid upon the exposed top layer using, for example, a guiding roller, bar, rod or beam. Such method requires an exact positioning of the distance between the surface of the substrate and the guiding roller which may be difficult under practical conditions. If the distance is too small too much pressure is exerted onto the top liquid precursor layer what results in a distortion of the topmost layer and in the formation of a fluid bead. The fluid bead induces a turbulent flow in the stack of liquid precursor layer so that mixing may occur. If the distance between the guiding roller and the substrate is too large, air-entrapment may occur between the release liner and the exposed surface of the top liquid precursor layer. This results in a poor surface finish of the cured topmost layer of the multilayer film characterized by high $R_z$ values. Also, curing of the topmost surface may be oxygen-sensitive. If the top liquid precursor layer comprises, for example, the precursor of an acrylate based pressure-sensitive adhesive, UV curing of such precursor will be impeded by the presence of oxygen so that an insufficient curing and hence distinctly diminished properties of the pressure-sensitive adhesive layer may occur.

When applying a release liner to the exposed surface of the top precursor layer via an appropriate roller, bar, rod, bead or the like arranged downstream to the downstream surface of the back wall, the exposed surface of the top layer is exposed to the ambient atmosphere in the distance between the back wall and such downstream coating knife which may result in a degradation of the top layer.

It was surprisingly found that cured light-transmissive multilayer film of the present disclosure which are obtainable by attaching a release liner to the exposed surface of the top layer of the precursor essentially simultaneously with the formation of such layer with subsequent curing, exhibit improved optical properties such as, in particular, a higher transmission in comparison to a corresponding multilayer film obtained by attaching a release liner to the stack of liquid precursor layers subsequently to the formation of the top precursor layer, for example, via an appropriate roller or bar knife in an open face distance in downstream direction from the downstream surface of the back wall of the coating apparatus. Hence the multilayer films of the present disclosure which are obtainable by attaching a release liner to the exposed surface of the top layer of the precursor essentially simultaneously with the formation of such layer with subsequent curing, are preferred.

The ratio of the transmission of the multilayer film obtainable by attaching a release liner to the exposed surface of the top layer of the precursor essentially simultaneously with the formation of such layer, i.e., for example, along the inner surface of the most downstream coating knife, over the transmission of a corresponding multilayer film obtained by subsequently applying a release layer in an open face distance in a downstream direction to where the top layer is formed is at least 1.002, more preferably at least 1.003 and especially preferably at least 1.005.

In such multilayer films the precursor materials are preferably selected so that the corresponding cured single precursor layers when measured at a thickness of 300 µm each exhibit a transmission of at least 80% relative to visible light as measured according to the test method specified in the test section below. The precursor layers used in the multilayer films of the present disclosure more preferably exhibit when present as a single 300 µm thick cured film a transmission of at least 90% and especially preferably of at least 95%. The light-transmission of the multilayer film relative to visible light which results from the light transmission of the superimposed polymer layers preferably is at least 80%, more preferably at least 85% and especially preferably at least 90%. If desired the multilayer film may comprise light-transmissive solid films such as, for example, light-transmissive polymer films or webs.

It was more specifically found by the present inventors that multilayer films of the present disclosure obtainable by curing a precursor wherein a release liner is applied to the exposed surface of the top layer of the precursor essentially simultaneously with the formation of such top layer with subsequent curing, exhibit advantageous properties in comparison to
  (i) laminated multilayer films obtained by laminating the corresponding cured precursor layer upon each other;
  (ii) multilayer films obtained by the die-coating method of the prior art (disclosed, e.g., in U.S. Pat. No. 4,894,259/ Kuller) where the release liner is attached to the exposed surface of the top layer surface at a position downstream to the most downstream coating knife, i.e. in an open face distance;
  (iii) multilayer films obtained where the release liner is attached to the exposed surface of the top layer surface at a position downstream to the most downstream coating knife, i.e. in an open face distance; and
  (iv) multilayer films obtained by applying one or more liquid precursor layers to one or more cured precursor films or one or more laminates of such precursor films with subsequent curing, irrespective of whether the release liner (if applied) was attached via the upstream surface of the back wall or an additional downstream coating knife.

It was also found, for example, that the light transmission for visible light of the multilayer of the present disclosure with a release liner applied to the top precursor layer essentially simultaneously with its formation is higher than the light transmission for visible of the corresponding multilayer films as defined in (i) to (iv). It was furthermore found, for example, that the multilayer film of the present disclosure with a release liner applied via the upstream surface of the back wall exhibits a higher mechanical stability and, in particular, a higher T-peel strength than the corresponding multilayer films as defined in (i) and (iv) above.

The liquid precursors suitable in the present disclosure comprise at least one compound having a curable ethylenically unsaturated group, in particular a radiation curable ethylenically unsaturated group. In a preferred embodiment, the radiation curable ethylenically unsaturated group is a (meth) acrylate group. In another preferred embodiment, the radiation curable ethylenically unsaturated group is a mono- and/ or poly(meth)acrylate functional oligomer compound comprising at least one urethane bond. The term "oligomer" as used above and below refers to relatively low molecular weight polymeric compounds. Poly(meth)acrylate functional oligomer compounds comprising at least one urethane bond preferably have a weight average molecular weight $M_w$ between 500 and 35,000 and more preferably of between 1,000 and 30,000. Such oligomeric compounds are typically liquid at room temperature and ambient pressure whereby the Brookfield viscosity is preferably less than 500 Pas and more preferably less than 200 Pa·s at 25° C.

The liquid precursor of the present disclosure preferably is essentially solvent-free, i.e. it does essentially not comprise any non-reactive solvents such as, for example, methanol, acetone, dimethylsulfoxide, or toluene. It is, however, possible though not preferred that the precursor comprises small amounts of one or more of such non-reactive solvents of preferably less than 2 pph and more preferably of less than 1 pph with respect to the mass of the precursor in order to lower the viscosity of the liquid precursor.

A preferred liquid precursor suitable in the present disclosure is curable to a pressure-sensitive adhesive. Especially preferred is a (meth)acrylate-based pressure-sensitive adhesive.

The liquid precursor of the (meth)acrylate based pressure sensitive adhesive comprises one or more alkyl(meth)acrylates, i.e. one or more (meth)acrylic acid alkyl ester monomers. Useful alkyl(meth)acrylates include linear or branched monofunctional unsaturated (meth)acrylates of non-tertiary alkyl alcohols, the alkyl groups of which have from 4 to 14 and, in particular, from 4 to 12 carbon atoms. Examples of these lower alkyl acrylates which are useful in the liquid precursor of (meth)acrylate based adhesives include n-butyl, n-pentyl, n-hexyl, cyclohexyl, isoheptyl, n-nonyl, n-decyl, isohexyl, isobornyl, 2-ethyloctyl, isooctyl, 2-ethylhexyl, tetrahydrofurfuryl, ethoxyethoxyethyl, phenoxyethyl, cyclic tri-methlypropane formal, 3,3,5-trimethylcyclohexyl, t-butylcyclohexyl, t-butyl acrylates and methacrylates. Preferred alkyl acrylates include isooctyl acrylate, 2-ethylhexyl acrylate, n-butylacrylate, tetrahydrofurfuryl acrylate, isobornyl acrylate, ethoxyethoxyethyl acrylate, phenoxyethyl acrylate, 3,3,5-trimethylcyclohexyl acrylate, and cyclohexyl acrylate. Particularly preferred alkyl acrylates include isooctyl acrylate and tetrahydrofurfuryl acrylate. Particularly preferred alkyl methacrylates include butyl methacrylate, cyclohexyl methacrylate, and isobornyl methacrylate.

The liquid precursor of the (meth)acrylate based pressure sensitive adhesive preferably comprises up to 5 and, in particular, 1-4 (meth)alkyl acrylates. The amount of the alkyl acrylate compounds with respect the total mass of (meth) acrylate functionalized monomers, oligomers and/or polymers with the exception of crosslinkers preferably is at least 75 wt. %, more preferably at least 85 wt. % and especially preferably between 85 and 99 wt. %.

The liquid precursor of the (meth)acrylate based pressure sensitive adhesive may furthermore comprise one or more moderately polar and/or strongly polar monomers. Polarity (i.e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol. 38, No. 496, pp. 269-280. Examples for strongly polar monomers are acrylic acid, methacrylic acid, itaconic acid, hydroxyalkyl acrylates, acrylamides and substituted acrylamides while, for example N-vinyl pyrrolidone, N-vinyl caprolactam, acrylonitrile, vinylchloride, diallyl phthalate and N,N-dialkylamino(meth) acrylates are typical examples of moderately polar monomers. Further examples for polar monomers include cyano acrylate, fumaric acid, crotonic acid, citronic acid, maleic acid, β-carboxyethyl acrylate or sulfoethyl methacrylate. The alkyl(meth)acrylate monomers enumerated above are typical examples of relatively poorly polar monomers. The amount of more moderately polar and/or strongly polar monomers preferably is not too high and, in particular, does not exceed 25 wt. % with respect to the total mass of meth)acrylate functionalized monomers, oligomers and/or polymers with the exception of crosslinkers.

The liquid precursor of the (meth)acrylate based pressure sensitive adhesive may furthermore comprise one or more monomers like mono- or multifunctional silicone (meth) acrylates. Exemplary silicone acrylates are Tego Rad products from the Evonik company, Germany, methacryloxyurea siloxanes or acrylamidoamido siloxanes.

Ethylenically unsaturated partly- or perfluorinated mono- or oligomers may also be part of the formulation of the liquid precursor. Examples are the perfluoropolyether acrylate Sartomer CN 4001, available from Sartomer Company Inc, or the F-oligomer II, synthesized as detailed I the "List of materials used" below.

The liquid precursor of the (meth)acrylate based pressure sensitive preferably comprises one or more crosslinker in an amount effective to optimize the cohesive or inner strength of the cured pressure sensitive adhesive. Useful crosslinkers for use in the liquid precursor of the (meth)acrylate based pressure sensitive include, for example, benzaldehyde, acetaldehyde, anthraquinone, various benzophenone-type and vinylhalomethyl-s-triazine type compounds such as, for example, 2,4-bis(trichloromethyl)-6-(4-methoxyphenyl)-s-triazine. Preferred are polyacrylic-functional monomers such as, for example, trimethylolpropane triacrylate, pentaerythritol tetraacrylate, 1,2-ethylene glycol diacrylate, tripropyleneglycol diacrylate, 1,6-hexanediol diacrylate or 1,12-dodecanediol diacrylate. The compounds listed above, which can be substituted or unsubstituted, are intended to be illustrative and by no means limitative. Other useful crosslinkers which could be used are thermal crosslinkers. Exemplary thermal crosslinkers include: melamine, multifunctional aziridiens, multifunctional isocyanates, di-carbonic acids/carbonic acid anhydides, oxazoles, metalchelates, amines, carbodiimides, oxazolidones, and epoxy compounds. Hydroxy-functional acrylates such as 4-hydroxybutyl(meth)acrylate or hydroxyethyl (meth)acrylate can be crosslinked, for example, with isocyanate or amine compounds.

Hydrolyzable, free-radically copolymerizable crosslinkers, such as monoethylenically unsaturated mono, di- and trialkoxy silane compounds including, but not limited to, methacryloxypropyltrimethoxysilane, vinyldimethylethoxysilane, vinylmethyldiethoxysilane, vinyltriethoxysilane, vinyltrimethoxysilane, vinyltriphenoxysilane, and the like are also useful crosslinking agents.

Aside from thermal, moisture or photosensitive crosslinking agents, crosslinking may achieve using high energy electromagnetic radiation such as gamma or e-beam radiation.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, and DE 10 2008 059 050 A, the relevant contents of which are herewith incorporated by reference. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

The crosslinking compounds are preferably present in an amount of 0.01 to 10 pph, in particular, between 0.01 and 5 pph and very specifically between 0.01 and 3 pph.

The liquid precursor of the (meth)acrylate based pressure sensitive preferably comprises one or more photoactivatable polymerization initiators such as, for example, benzoin ethers (e.g., benzoin methyl ether, benzoin isopropyl ether, substituted benzoin ethers such as anisoin methyl ether), acetophenones (e.g., 2,2-diethoxyacetophenone), substituted acetophenones such as 2,2-diethoxyacetophenone, 2,2-dimethoxy-2-phenyl-acetophenone, and 1-phenyl-2-hydroxy-2-methyl-1-propanone, substituted alpha-ketols (e.g., 2-methyl-2-hydroxy-propiophenone), aromatic sulphonyl chloride, and photoactive oximes such as 1-phenyl-1,1-propanedione-2-(O-ethoxycarbonyl) oxime and/or thermally activatable initiators such as, for example, organic peroxides (e.g., benzoyl peroxide and lauryl peroxide) and 2,2'-azobis (isobutyronitrile). The liquid precursor preferably comprises between 1-3 and, in particular, between 1-2 photonitiator compounds; especially preferred are liquid precursors comprising only one photoinitiator compound. The photoinitiator compounds are preferably present in an amount of 0.01-2.00 pph, in particular, between 0.05-1.00 pph and very specifically between 0.1-0.5 pph.

The liquid precursor of the (meth)acrylate based pressure sensitive may comprise other components and adjuvents such as tackifiers, plasticizers, reinforcing agents, dyes, pigments, light stabilizing additives, antioxidants, fibers, electrically and/or thermally conducting particles, fire retardants, surface additives (flow additives), rheology additives, nanoparticles, degassing additives, glass bubbles, polymeric bubbles, beads, hydrophobic or hydrophilic silica, calcium carbonate, blowing agents, reinforcing and toughening agents.

The liquid precursor of the (meth)acrylate based pressure sensitive is preferably prepared by adding part of the photoinitiator compounds to a monomer mixture comprising the alkyl(meth)acrylate monomers and the moderately polar and/or strongly polar monomers and partially polymerizing such mixture to a syrup of a coatable viscosity of, for example, 300-35,000 mPa·s (Brookfield, 25° C.). The viscosity of the resulting precursor is further adjusted by adding the other compounds such as crosslinker compounds, the remainder of the photoinitiator compounds, silicone (meth)acrylates and any additives and adjuvants as may be used. The viscosity of the resulting precursor can also be adjusted by adding a small amount of typically less than 5 pph of a polymeric additive such as, for example, reactive, photopolymerizable polyacrylates. The partial polymerization of the monomer mixture is preferably carried out with appropriate UV lamps having at a wavelength between 300-400 nm with a maximum at 351 nm at an intensity of preferably between about 0.1 to about 25 mW/cm$^2$. The exposure preferably is between 900-1,500 mJ/cm². The polymerization may be stopped either by removal of the UV and/or the introduction of, for example, radical scavenging oxygen. An example of a suitable UV-curing station is described in connection with the coating apparatus described in the Examples below.

Another preferred liquid precursor suitable in the present disclosure is UV-curable and comprises at least one ethylenically unsaturated compound comprising at least one urethane bond. Such compounds preferably are monomers or oligomers, and/or at least one of the ethylenically unsaturated groups preferably is a (meth)acrylate group. Such precursor can be polymerized to a polyurethane acrylate polymer, i.e. to a polymer comprising urethane bonds. Especially preferred is a liquid precursor comprising one or more mono- and/or multi(meth)acrylate functional monomer or oligomer compounds comprising at least one urethane bond, one or more monomer compounds comprising one or more ethylenically unsaturated groups but no urethane bond and one or more photoinitiators.

Mono- and multi-(meth)acrylate functional oligomers comprising at least one urethane bond are commercially available, for example, from Rahn AG, Zurich, Switzerland under the GENOMER trade designation. GENOMER 4188 is a mixture consisting of 80 wt. % of a monoacrylate-functional polyester based oligomer comprising at least one urethane bond, and 20 wt. % of 2-ethylhexyl-acrylate; the oligomer comprised by GENOMER 4188 has a weight average molecular weight $M_w$ of about 8,000 and the average acrylate functionality is 1±0.1. GENOMER 4316 is an aliphatic trifunctional polyurethane acrylate characterized by a viscosity of 58,000 mPas at 25° C. and a glass transition temperature $T_g$ 4° C. GENOMER 4312 is an aliphatic trifunctional polyester urethane acrylate characterized by a viscosity of 50,000-70,000 mPas at 25° C.

The mono- or multi-(meth)acrylate functional oligomer compounds each have at least one, preferably at least 2 and more preferably at least 4 urethane bonds.

Mono- and multi-(meth)acrylate functional oligomers and their preparation are disclosed on p. 4, ln. 24-p. 12, ln. 15 of WO2004/000,961 which passage is herewith incorporated by reference.

The amount of the one or more mono- or multi-(meth) acrylate functional oligomers comprising at least one urethane bond with respect to the total mass of (meth)acrylate functionalized monomers, oligomers and/or polymers with the exception of crosslinkers preferably is from 30-97.5 wt. % and more preferably from 45-95 wt. %.

The liquid precursor of the polyurethane polymer suitable in the present disclosure furthermore preferably comprises one or more monomer compounds comprising one or more ethylenically unsaturated group but no urethane bond. Examples of suitable ethylenically unsaturated groups include vinyl, vinylene, allyl and, in particular, (meth)acrylic groups. The amount of such compounds with one or more ethylenically unsaturated group total mass of (meth)acrylate functionalized monomers, oligomers and/or polymers with the exception of crosslinkers preferably is from 2.5-70 wt. % and more preferably from 5-55 wt. %.

Compounds with one or more (meth)acrylic groups can preferably be selected from the poorly polar alkyl(meth)acrylate monomers, the moderately polar and/or strongly polar monomers and the two- or higher acrylic group functional crosslinkers disclosed above in connection with the liquid precursor of the acrylate-based pressure-sensitive adhesive.

The liquid precursor of the polyurethane polymer preferably comprises one or more (meth)acrylate monofunctional compounds having a glass transition temperature of the corresponding homopolymer of less than 10° C. Preferred examples of such monomers include n-butyl acrylate, isobutyl acrylate, hexyl acrylate, 2-ethylhexyl acrylate, isooctyl acrylate, caprolactone acrylate, isodecyl acrylate, tridecyl acrylate, lauryl methacrylate, methoxy-polyethylenglycol-monomethacrylate, lauryl acrylate, tetrahydrofurfuryl acrylate, ethoxy-ethoxyethyl acrylate and ethoxylated-nonyl acrylate. Especially preferred are 2-ethylhexyl acrylate, isooctyl acrylate and tetrahydrofurfuryl acrylate.

The liquid precursor of the polyurethane polymer preferably comprises one or more (meth)acrylate monofunctional compounds having a glass transition temperature of the corresponding homopolymer of 50° C. or more. Preferred examples of such monomers include acrylic acid, N-vinylpyrrolidone, N-vinyl caprolactam, isobornyl acrylate, acryloylmorpholine, isobornyl methacrylate, phenoxyethyl acrylate, phenoxyethyl methacrylate, methylmethacrylate and acrylamide. Especially preferred are acrylic acid, isobornyl acrylate and N-vinyl caprolactam.

Examples of compounds with two or more ethylenically unsaturated groups which are suitable in the curable liquid precursor of the polymer comprised in the layer or layers of the multilayer film of the present disclosure include $C_2$-$C_{12}$ hydrocarbondiol diacrylates such as 1,6-hexanediol diacrylate, $C_4$-$C_{14}$ hydrocarbon divinylethers such as hexanediol divinylether and $C_3$-$C_{12}$ hydrocarbontriol triacrylates such as trimethylolpropanetriacrylate. Two or higher acrylate functional monomers and, in particular, two- or three acrylate-functional monomers are preferred.

The liquid precursors described above are to exemplify the present disclosure without limiting it.

In another preferred embodiment, light-transmissive multilayer films according to the present disclosure comprise at least two superimposed polymer layers wherein one of the outer layers of the multilayer film comprises a polyurethane polymer and the opposite outer layer of the multilayer film comprises an adhesive and more preferably a (meth)acrylate based pressure-sensitive adhesive. Such multilayer film has a maximum wave-front aberration of a wavefront resulting from a planar wavefront of a wavelength of λ=635 nm impinging normally on the top layer and transmitted through the multilayer film, measured as the peak-to-valley value of the transmitted wavefront, of less than 6λ (=3,810 nm).

The value of the maximum aberration of a planar wavefront measured subsequent to its transmission through a multilayer film of the present disclosure characterizes the distortion the wavefront experiences as a result of its interaction with the multilayer film. The lower the value of the maximum wave-front aberration the higher the optical quality of the film (e.g. less distortions of an image projected through the film).

The superimposed polymer layers each preferably have a transmission of at least 80% relative to visible light. The transmission of the polymer layers is measured according to the test method specified in the test section below for cured single precursor layers having a thickness of 300 μm each. The precursor layers used in the multilayer films of the present disclosure more preferably exhibit when present as a single 300 μm thick cured film a transmission of at least 90% and especially preferably of at least 95%. The light-transmission of the multilayer film relative to visible light which results from the light transmission of the superimposed polymer layers preferably is at least 80%, more preferably at least 85% and especially preferably at least 90%. If desired the multilayer film may comprise light-transmissive solid films such as, for example, light-transmissive polymer films or webs.

The top liquid precursor layer is provided by a polyurethane polymer. The term polyurethane polymer as used above and below relates to cured polymers comprising at least one urethane bond which is typically formed by the reaction of isocyanate-functional and hydroxy-functional monomers. In the present disclosure the term polyurethane polymer preferably relates to a polymer obtainable by the polymerization of a liquid precursor comprising at least one ethylenically unsaturated compound comprising at least one urethane bond.

In the present disclosure the polyurethane polymer is preferably obtained by curing a liquid precursor comprising one or more mono- and/or poly(meth)acrylate functional oligomer compounds comprising at least one urethane bond, one or more monomer compounds comprising one or more ethylenically unsaturated groups but no urethane bond and one or more photoinitiators. Such preferred liquid precursor of a polyurethane polymer is described in detail above.

The outer layer of these preferred multilayer films opposite to the outer polyurethane layer preferably comprises a cured (meth)acrylate-based pressure-sensitive adhesive which is preferably obtained by curing the preferred liquid precursor of a corresponding pressure-sensitive adhesive disclosed above.

It was found by the present inventors that the multilayer film of the present disclosure comprising an outer layer comprising a polyurethane polymer and an opposite outer layer comprising an adhesive and, in particular, a (meth)acrylate based pressure-sensitive adhesive layer exhibits favorable optical properties such as, in particular, a low maximum aberration of a planar wavefront subsequent to its transmission through the cured multilayer film, a high transmission, a low haze and/or a low color shift as can be evaluated by the methods described in the test section below.

In FIG. 1, a coating apparatus 1 is shown with which the inventive method is carried out. The coating apparatus 1 comprises two coating knives 2, 3 which are offset from a substrate 4 in the form of a (bottom) release liner, thus forming gaps between the respective bottom portions of the coating knives 2, 3 and the substrate 4. The substrate 4 is moved in a downstream direction 5 relatively to the coating apparatus 1 as indicated by an arrow. The coating knives 2, 3 are vertically arranged, spaced apart and held independently from each other and can be moved in a vertical direction to change the gap width to the substrate 4. The coating knives 2, 3 can further be moved relatively to each other in a lateral direction in order to modify the lateral distance between the coating knives 2, 3.

The lateral spaces between adjacent coating knives 2, 3 define a coating chamber 6 in which an acrylic liquid precursors II is provided under ambient pressure. The liquid precursor II develops pressure sensitive adhesive characteristics after UV curing and further contains 0.25 wt.-% of an oligomer of gamma-glycidoxypropyltrimethoxysilane (GLYMO). The oligomer was yielded by a condensation reaction of GLYMO, whereas the oligomer contained about 6 GLYMO units in average.

The front wall and the back wall of the coating chamber 6 are defined by the respective adjacent coating knives 2, 3. A second liquid precursor I is provided in front of the upstream coating knife 2 as a rolling bead 7. The liquid precursor I is an acrylic foam precursor developing pressure sensitive adhesive characteristics after UV curing, i.e. an acrylic precursor filled with expandable microspheres.

In the coating chamber 6, a solid film 8 in the form of a release liner of 150 µm thickness is conveyed on the upstream side of the coating knife 3 essentially simultaneously with the curable liquid precursor II.

By moving the substrate 4 relatively to the coating apparatus 1 in the downstream direction 5, the liquid precursors I, II are deposited onto the substrate 4 in a self-metered manner and superimposed on one another in the order of the arrangement of the liquid precursors I, II to form precursor layers 9, 10, which are top-covered by the release liner 8. The gap between the first coating knife 2 and the substrate 4 is such that a precursor layer 9 has a thickness of about 1975+/−50 µm. The offset between the coating knives 2, 3 is adjusted in such a way that the precursor layer 10 achieves a thickness of about 85+/−10 µm.

Figure 2:
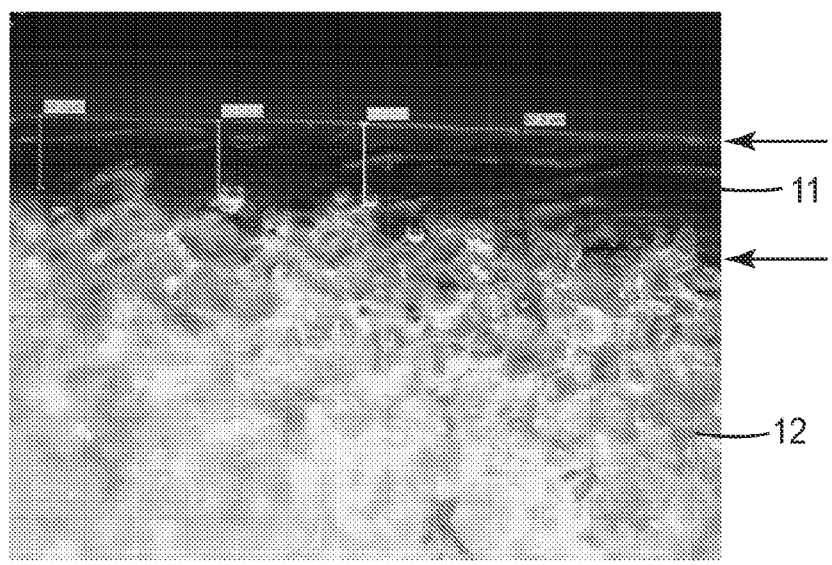
FIG. 2 is a cross-sectional SEM-photograph of a double-sided dual-layer PSA film.

The multilayer film is then cured in a UV-curing station to yield a dual-layered double-sided pressure sensitive adhesive tape with one adhesive side being optimized for bonding glass surfaces, whereas the opposing surface shows good adhesion to metallic surfaces or powder coated metallic surfaces and is being filled with hollow microspheres. FIG. 2 shows a cross-sectional SEM-picture of such a cured PSA film. The upper arrow indicates the surface of the acrylate pressure sensitive adhesive skin-layer 11 containing the GLYMO oligomer, whereas the lower arrow marks the interface between the skin-layer 11 and the acrylate pressure sensitive adhesive foam-layer 12.

Figure 3:
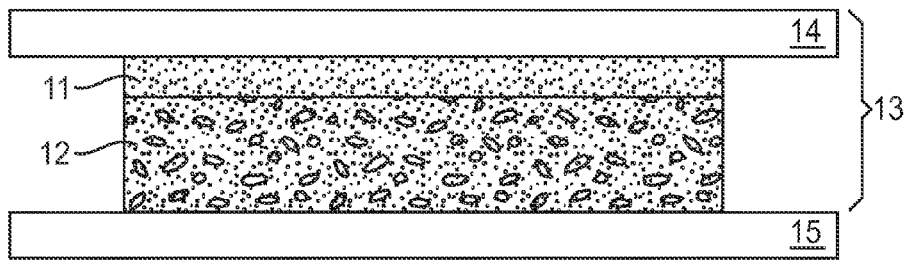
FIG. 3 is a schematic cross-sectional view of an assembly with a double-sided dual-layer PSA film on a glass substrate bonded to a metal surface.

FIG. 3 shows an inventive assembly 13 comprising a dual-layered double-sided pressure sensitive adhesive film of this invention with a GLYMO oligomer in its acrylic pressure sensitive adhesive skin-layer 11 and a glass substrate 14, currently the backside of a solar panel. The acrylic pressure sensitive adhesive foam-layer 12 is bonded to a metal substrate 15, like steel.

Item 1 is a multilayer pressure sensitive adhesive (PSA) film having a first pressure sensitive adhesive layer for bonding glass substrates and at least a second opposing layer, the first pressure sensitive adhesive layer being a polymerization reaction product of a precursor comprising a monomer or a partially prepolymerized monomer having a curable ethylenically unsaturated group, whereas the precursor further comprises an oligomeric organofunctional silicone having at least 2 Si atoms, in particular 2 to 10 Si atoms, wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group, or wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;

with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group.

Item 2 is the PSA film of item 1, wherein the coupling group having a Zerewitinow-active H-atom is selected from C—H acidic organic groups, —OH, —SH, —COOH, —NH$_2$ or —NHR with R being an organic rest.

Item 3 is the PSA film of item 1 or 2, wherein the coupling group which is reactive to the coupling group with a Zerewitinow-active H-atom is selected from an epoxy group, —NCO, —SCO or an aziridine group.

Item 4 is the PSA film according to any of the preceding items, wherein the silicone has the general Formula (I):

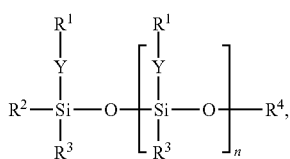

Formula (I)

wherein:
R$^1$ is an organic rest having at least one coupling group,
R$^2$ being a substituted or unsubstituted alkyl-, alkoxy- or alkenyl-group, like a methyl-, ethyl-, methoxy- or ethoxy-group, H or OH,
R$^3$ being an hydroxy-, a substituted or unsubstituted alkyl-, alkoxy- or alkenyl-group, in particular a methyl-, ethyl-, methoxy- or ethoxy-group,
R$^4$ being a substituted or unsubstituted alkyl- or alkenyl-group, like a methyl- or ethyl-group or H,
Y being a saturated or unsaturated substituted or unsubstituted hydrocarbon-di-radical and
n being an integer ≥1, in particular from 1 to 9, especially 2 to 7, further preferred 3 to 6.

Item 5 is the PSA film according to item 4, wherein R$^1$ comprises an epoxy group, a hydroxyl group, a primary or secondary amine group or an aziridine group as coupling group, wherein R$^2$ is in particular a hydrogen atom and/or wherein Y—R$^1$ is in particular represented by the radical of Formula (II):

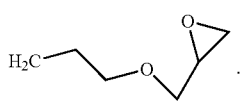

Formula (II)

Item 6 is the PSA film according to any of the preceding items, wherein the monomer having the curable ethylenically unsaturated group and the coupling group with a Zerewitinow-active H-atom is selected from acrylic acid and/or methacrylic acid.

Item 7 is the PSA film according to any of the preceding items, wherein the first pressure sensitive adhesive contains 0.05 to 2 wt.-% of the oligomeric organofunctional silicone.

Item 8 is the PSA film according to any of the preceding items, wherein the precursor of the first pressure sensitive adhesive layer comprises an acrylic monomer or a partially prepolymerized acrylic monomer.

Item 9 is the PSA film according to any of the preceding items, wherein the first pressure sensitive adhesive layer containing the silicone is substantially free of filler particles, cavities in the form of microspheres, expendable microspheres, in particular pentane filled expendable microspheres or gaseous cavities or glass bubbles.

Item 10 is the PSA film according to any of the preceding items, wherein the second opposing layer contains filler particles, cavities in the form of microspheres, expendable microspheres, in particular pentane filled expendable microspheres or gaseous cavities, glass bubbles or combinations thereof.

Item 11 is the PSA film according to any of the preceding items, wherein the second opposing layer is a pressure sensitive adhesive layer.

Item 12 is the PSA film according to any of the preceding items, wherein the precursor of at least one pressure sensitive adhesive layer contains an acrylic monomer with at least one amide group, in particular N-vinylcaprolactam, N-vinylpyrrolidone, acryloxyl morpholine, N-isopropylacrylamide, diacetone acrylamide or mixtures thereof, especially the precursor of the first pressure sensitive adhesive layer.

Item 13 is the PSA film of item 12, wherein the precursor of at least one pressure sensitive adhesive layer comprising the acrylic monomer with at least one amide group contains 0.1 to 8 wt.-% of a strongly polar acrylate, in particular 0.1 to 6 wt.-%, preferably 0.1 to 4 wt.-% or even 0.1 to 2 wt.-%, wherein the strongly polar acrylate is especially chosen from the group comprising acrylic acid, methacrylic acid, itaconic acid, hydroxyalkyl acrylates, acrylamides and substituted acrylamides or mixtures thereof.

Item 14 is the PSA film according to any of the preceding items, wherein between the first pressure sensitive adhesive layer and the second opposing layer, at least one intermediate layer is present, which in particular contains filler particles, cavities in the form of microspheres, expendable microspheres, in particular pentane filled expendable microspheres or gaseous cavities, glass bubbles or combinations thereof.

Item 15 is a continuous self-metered process of forming a multilayer film having pressure sensitive characteristics and comprising at least two superimposed polymer layers, wherein the process comprises the steps of:
(i) providing a substrate (4);
(ii) providing two or more coating knives (2, 3) which are offset, independently from each other, from said substrate (4) to form a gap normal to the surface of the substrate (4);
(iii) moving the substrate (4) relative to the coating knives (2, 3) in a downstream direction (5),
(iv) providing curable liquid precursors of the polymers to the upstream side of the coating knives (2, 3) thereby coating the two or more precursors through the respective gaps as superimposed layers (9, 10) onto the substrate (4), the precursor comprising a monomer or a partially prepolymerized monomer, the monomer having a curable ethylenically unsaturated group, whereas the precursor further comprises an oligomeric organofunctional silicone having at least 2 Si atoms, in particular 2 to 10 Si atoms,
wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group,
or
wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;
with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group;

(v) optionally providing one or more solid films (8) and applying these essentially simultaneously with the formation of the adjacent lower polymer layer, and (vi) curing the precursor of the multilayer film thus obtained;

wherein a lower layer of a curable liquid precursor is covered by an adjacent upper layer of a curable liquid precursor or a film, respectively, whereas at least one of said precursors has pressure sensitive characteristics after the curing step (vi), in particular the precursor comprising the oligomeric silicone.

Item 16 is the process of item 15, wherein the precursor layers are cured thermally and/or by exposing them to actinic radiation after they have passed the back wall of a coating apparatus (1).

Item 17 is a multilayer pressure sensitive adhesive film obtainable by the process according to item 15 or 16.

Item 18 is an assembly comprising a substrate having a surface energy of 300 mJ/m² or more, in particular a glass substrate, and a PSA film according to any of items 1 to 14 or 17, wherein the PSA film is attached to the substrate surface with its first pressure sensitive adhesive layer.

Item 19 is the use of a multilayer pressure sensitive adhesive film according to any of the preceding items in structural glazing applications, in particular for adhesively bonding a glass substrate to a metallic surface, wherein the metallic surface is preferably a metallic frame comprising a material selected from the group consisting of aluminum, steel, stainless steel, PVC, composite materials, fibre reinforced materials, and any combinations or mixtures thereof.

Item 20 is the use of a multilayer pressure sensitive adhesive film according to any of the preceding items for the bonding of glass substrates to plastic substrates preferably selected from the group of car water boxes and car window lace profiles.

Test Methods Used

Brookfield Viscosity

The viscosity of the liquid precursors is measured at 25° C. according to DIN EN ISO 2555:1999 using a Brookfield Digital Viscosimeter DV-II, commercially available from Brookfield Engineering Laboratories, Inc.

Test Samples:

Floatglass air side (Rocholl GmbH), 150×50×3 mm.

Glass Cleaning Process:

1) Cleaning with a mixture of isopropyl alcohol:distilled water (1:1); two times.

2) Drying with a tissue.

90°-Peel-Test at 300 mm/min (According to Test Method TM-1637)

Cut out a 12.7 mm wide and >120 mm length specimen in the machine direction from the test sample. Remove the liner from each strip and bring it on the glass plate using light finger pressure. Roll in each direction with the standard FINAT test roller (6.8 kg) at a speed of approx. 10 mm per second to obtain intimate contact between the adhesive mass and the surface. After applying the strip to the test plate, leave for a period of 72 h before testing. Fix the test plate and strip into the horizontal support. Set the machine at 300 mm per minute jaw separation rate. Test results are expressed in Newton per 10 mm. The quoted peel values are the average of three 90°-peel measurements.

Aging Test:

1) The peel test plates are stored at 38° C. and 98% relative humidity.

2) The peel test plates are stored at 85° C. and 85% relative humidity for 500 and 1000 hours.

Storing Conditions of Tapes:

1) Storing under normal climate conditions: 23° C.+/−2° C. with 50% r.h.+/−5% for 3 and 6 months.

2) Shrink-wrapped in Aluminium/PET bags containing silica bags to avoid any moisture contact. Stored at room temperature for 3 and 6 month.

3) Tape stripes are stored in a dessicator. A saturated sodium carbonate solution is placed into the dessicator, in order to increase humidity to 92% at 23° C. Under these conditions an accelerating aging can be simulated.

LIST OF MATERIALS USED

2-Ethylhexylacrylate (2-EHA) is an ester of 2-ethylhexylalcohol and acrylic acid which was obtained from BASF AG, Germany.

Acrylic acid (AA), obtained from 3M Hilden, Germany.

1,6-Hexanedioldiacrylate (HDDA) is a fast curing diacrylate monomer obtained from 3M Hilden, Germany.

N-Vinylcaprolactam (NVC), commercially available from BASF AG, Germany monofunctional acrylic monomer with an amide-group in the side-chain.

THF-acrylate (2839) (THF-A), commercially available from AgiSyn, Japan: monofunctional acrylic monomer with a Tg of −12° C.

Isobornylacrylate (IBOA), commercially available as SR506D from Sartomer, France.

OMNIRAD BDK, commercially available from iGm resins, Waalwijk Netherlands: 2,2-Dimethoxy-2-phenylacetophenone (UV-initiator).

COATOSIL MP200, commercially available from Momentive, USA: Epoxy-Silane Oligomeric based on γ-glycidoxyypropyltrimethoxysilane.

SILQUEST A187, commercially available from Momentive, USA: γ-glycidoxyypropyltrimethoxysilane.

AEROSIL R972, commercially available from Evonik, Germany: fumed silica.

Glass bubbles K 15 (GBK15), available from 3M, Germany.

GT 6008, acrylic foam tape, commercially available from 3M, Germany

Structural Glazing tape G23F, commercially available from 3M, Germany.

3M Silane Glass Primer, commercially available from 3M, Germany.

Preparation of the Liquid Precursors for the Skin Layers:

For each of the skin-layers LPS 1 to LPS 3, a precursor syrup is prepared by adding 90 wt. % 2-EHA and 10 wt. % of acrylic acid in a vessel containing 0.04 pph of Omnirad BDK. The mixture is partially polymerized under a nitrogen-rich atmosphere by UV radiation under continuous stirring with a propeller stirrer (300 U/min) and the reaction is stopped when the stirring moment reaches a value of 70 units (Brookfield viscosity of 4200 mPa·s at 25° C.). Subsequent to the curing, 0.1 pph of 1,6-hexanediol diacrylate (HDDA) as a crosslinker, 0.16 pph of Omnirad BDK as a photoinitiator, and in case of LPS 1, 0.25 wt. % of Silquest A 187 are added and the resulting mixture is thoroughly stirred for 30 minutes. For LPS 2, 0.25 wt. % of CoatOSil MP 200 is added instead of 0.2 wt. % of Silquest A 187. Liquid precursor LPS 3 contains no silicone.

Preparation of the Liquid Precursors for the Foam Layers:

For each one of the single-layer foam constructions (self-stick) based on the liquid precursors LPF 1 and LPF 2, the precursor syrup is prepared by adding 90 wt. % 2-EHA and 10 wt. % of acrylic acid in a vessel containing 0.04 pph of Omnirad BDK. The mixture is partially polymerized under a nitrogen-rich atmosphere by UV radiation under continuous stirring with a propeller stirrer (300 U/min) and the reaction is stopped when the stirring moment reaches a value of 70 units (Brookfield viscosity of 4200 mPa·s at 25° C.). Subsequent to the curing, 0.25 wt. % of Silquest A 187, 0.1 pph of 1,6-hexanediol diacrylate (HDDA) as a crosslinker, 0.16 pph of Omnirad BDK as a photoinitiator, 4 pph of glass bubbles K15 and 4 pph of Aerosil 972 are added and the resulting mixture is thoroughly stirred for 30 minutes to provide a foam.

Further single-layer foam constructions (self-stick) based on the liquid precursors LPF 3, LPF 4 and LPF 5 are prepared by adding 98.5 wt. % 2-EHA and 1.5 wt. % of acrylic acid in a vessel containing 0.04 pph of Omnirad BDK. The mixture is partially polymerized under a nitrogen-rich atmosphere by UV radiation under continuous stirring with a propeller stirrer (300 U/min) and the reaction is stopped when the stirring moment reaches a value of 70 units (Brookfield viscosity of 4200 mPa·s at 25° C.). Subsequent to the curing, either 11.11 wt. % of IBOA (LPF 3) or NVC (LPF 4) or THF-acrylate (LPF 5), 0.25 wt. % of Coat-O-Sil MP 200, 0.1 pph of 1,6-hexanediol diacrylate (HDDA), 0.16 pph of Omnirad BDK, 4 pph of glass bubbles K15 and 4 pph of Aerosil 972 are added and the resulting mixture is thoroughly stirred for 30 minutes to provide a foam. An overview of the single-layer foam constructions and their compositions is shown in Table 1 below.

TABLE 1

| Sample | LPF 1 | LPF 2 | LPF 3 | LPF 4 | LPF 5 |
|---|---|---|---|---|---|
| 2-EHA | 90.00 | 90.00 | 98.50 | 98.50 | 98.50 |
| AA | 10.00 | 10.00 | 1.50 | 1.50 | 1.50 |
| Omnirad BDK (pph) | 0.04 | 0.04 | 0.04 | 0.04 | 0.04 |
| Aerosil R 972 (pph) | 4.00 | 4.00 | 4.00 | 4.00 | 4.00 |
| GBK 15 (pph) | 4.00 | 4.00 | 4.00 | 4.00 | 4.00 |
| IBOA | | | 11.11 | | |
| NVC | | | | 11.11 | |
| THF-Acrylate | | | | | 11.11 |
| Silquest A 187 | 0.25 | | | | |
| Coat-O-Sil MP 200 | | 0.25 | 0.25 | 0.25 | 0.25 |
| HDDA (pph) | 0.10 | 0.10 | 0.10 | 0.10 | 0.10 |
| Omnirad BDK (pph) | 0.16 | 0.16 | 0.16 | 0.16 | 0.16 |

Another liquid foam precursor LPF 6 is prepared by adding 90 wt. % 2-EHA and 10 wt. % of acrylic acid in a vessel containing 0.04 pph of Omnirad BDK. The mixture is partially polymerized under a nitrogen-rich atmosphere by UV radiation under continuous stirring with a propeller stirrer (300 U/min) and the reaction is stopped when the stirring moment reached a value of 70 units (Brookfield viscosity of 4200 mPa·s at 25° C.). Subsequent to the curing, 0.1 pph of 1,6-hexanediol diacrylate as a crosslinker, 0.16 pph of Omnirad BDK as a photoinitiator, 3 pph of Aerosil R 972 and 6 pph glass bubbles K15 are added and the resulting mixture is thoroughly stirred for 30 minutes to provide a foam.

Liquid precursor LPF 6 is used in dual-layer foam constructions (skin/core constructions) as standard foam core, in combination with either skin layer LPS 1, LPS2 or LPS 3. The coating is done using a wet-in-wet process as described below. In Table 2 below, the comparison of the samples containing LPF 6 are summarized in weight parts.

TABLE 2

| | Dual-layer skin | | | Dual-layer core |
|---|---|---|---|---|
| Sample | LPS 1 | LPS 2 | LPS 3 | LPF 6 |
| 2-EHA | 90.00 | 90.00 | 90.00 | 90.00 |
| AA | 10.00 | 10.00 | 10.00 | 10.00 |
| Omnirad BDK I | 0.04 | 0.04 | 0.04 | 0.04 |
| Aerosil R 972 | | | | 3.00 |
| GBK 15 | | | | 6.00 |
| Siquest A 187 | 0.25 | | | |
| Coat-O-Sil MP 200 | | 0.25 | | |
| HDDA | 0.10 | 0.10 | 0.113 | 0.113 |
| Omnirad BDK II | 0.16 | 0.16 | 0.204 | 0.204 |

Coating:

A coating apparatus comprising two coating stations I and II as described previously and schematically shown in FIG. 1 is used. The PSA is coated on 75 µm solvent free siliconized PET-liners (160 mm width). For the experiments listed below, the line speed of the lab-coater is set to 0.71 m/min. The tape thickness is 2 mm.

The following intension profile is used for the UV-curing. The total radiation intensity irradiated cumulatively from top and bottom and the respective length of the two coating zones is as follows:

| | Zone 1 (length 200 cm) | Zone 2 (length 100 cm) |
|---|---|---|
| Total intensity [mW/cm$^2$] | 2.07 | 4.27 |

For comparative tests, a tape G23F is used, which is a dual-layer skin/core laminated acrylic foam tape (thickness 2.3 mm) for structural glazing application, in combination with 3M Silane Glass Primer.

Examples and Test Results

Table 3 below shows the examples used for testing. Ex.1, Ex.2 and Ex.8 are dual-layer foam constructions and Ex.3 to Ex.7 represent the single-layer foam constructions (self-stick).

TABLE 3

| Example No. | LPF used | LPS used | Construction type |
|---|---|---|---|
| Ex. 1 | 6 | 1 | Dual-layer (skin/core) |
| Ex. 2 | 6 | 2 | Dual-layer (skin/core) |
| Ex. 3 | 1 | — | Single-layer (self-stick) |
| Ex. 4 | 2 | — | Single-layer (self-stick) |
| Ex. 5 | 3 | — | Single-layer (self-stick) |
| Ex. 6 | 4 | — | Single-layer (self-stick) |
| Ex. 7 | 5 | — | One layer (self-stick) |
| Ex. 8 | 6 | 3 | Dual-layer (skin/core) |

Table 4 below shows the results of the 90° peel tests on glass after storage at 23° C. and 50% r.h. at various storage duration and after application to the glass substrate and a dwell time of 72 h. The dual-layer skin/core construction of Ex.1 and Ex.2 show excellent adhesion forces over the storing period of 6 months at 23° C. and 50% r.h.

TABLE 4

| Sample: | 0 months | 3 months | 6 months |
|---------|----------|----------|----------|
| Ex. 1 | 80 N/cm | 76 N/cm | 81 N/cm |
| Ex. 2 | 78 N/cm | 80 N/cm | 82 N/cm |
| Ex. 3 | 56 N/cm | 42 N/cm | 31 N/cm |
| Ex. 4 | 65 N/cm | 41 N/cm | 32 N/cm |

In Table 5 below, the 90° peel tests on glass after storage at 23° C. and dry shrink-wrapping are summarized for various storage durations and after application to the glass substrate and a dwell time of 72 h.

TABLE 5

| Sample: | 0 months | 3 months | 6 months |
|---------|----------|----------|----------|
| Ex. 1 | 80 N/cm | 70 N/cm | 38 N/cm |
| Ex. 2 | 78 N/cm | 69 N/cm | 68 N/cm |
| Ex. 3 | 57 N/cm | 38 N/cm | 38 N/cm |
| Ex. 4 | 64 N/cm | 41 N/cm | 39 N/cm |

The dual-layer skin/core construction of Ex.2 having the oligomeric silicone in the adhesive skin layer show excellent adhesion forces over the storage period of 6 months when dry packed.

Figure 4:
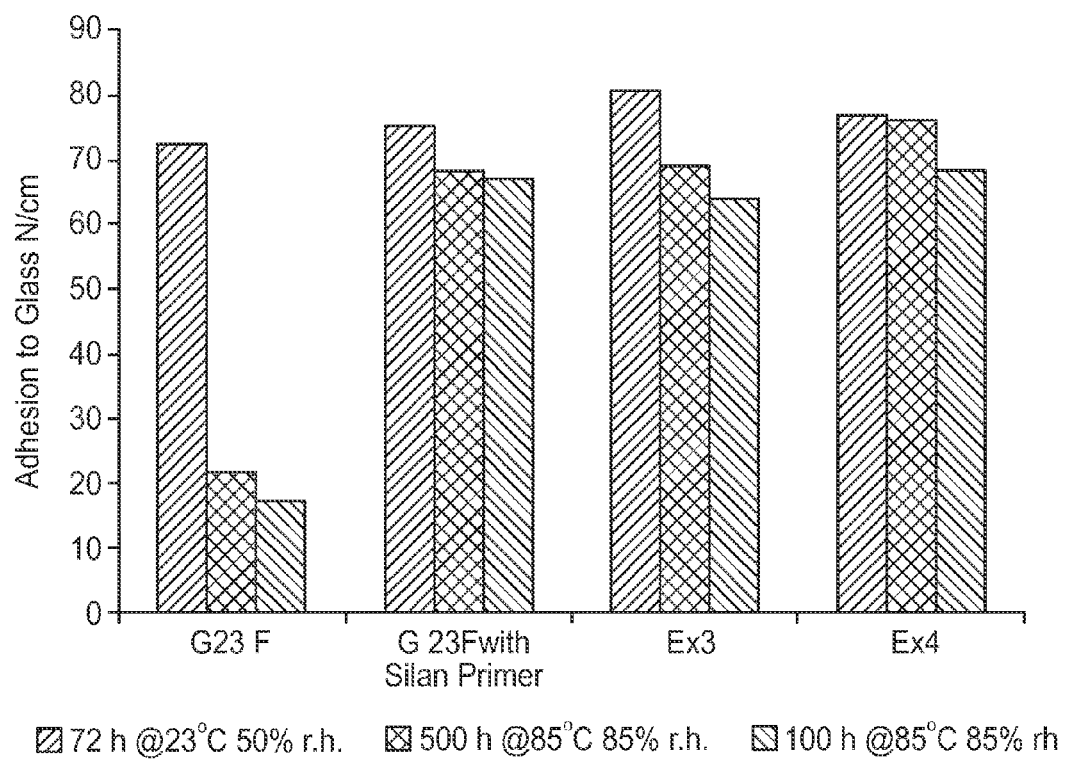
FIG. 4 shows the aging behavior of dual-layer PSA films.

In FIG. 4, the 90° Peel values after 72 h dwell time on glass and after aging at 85° C. and 85% r.h. for 500 h and 1000 h are displayed. The results show excellent adhesion forces of the inventive dual-layer skin/core tape Ex.2 compared to the comparative tape G23F used in combination with 3M Silane Glass Primer.

The examples show that the inventive PSA multilayer films with an oligomeric silicone in the pressure sensitive adhesive layer show higher storage stability compared to PSA tapes comprising non-oligomeric silicones. Further, the bond strength to a glass substrate is also superior, as it is less affected by humidity, which makes the inventive tapes more endurable, especially for outdoor applications.

Figure 5:
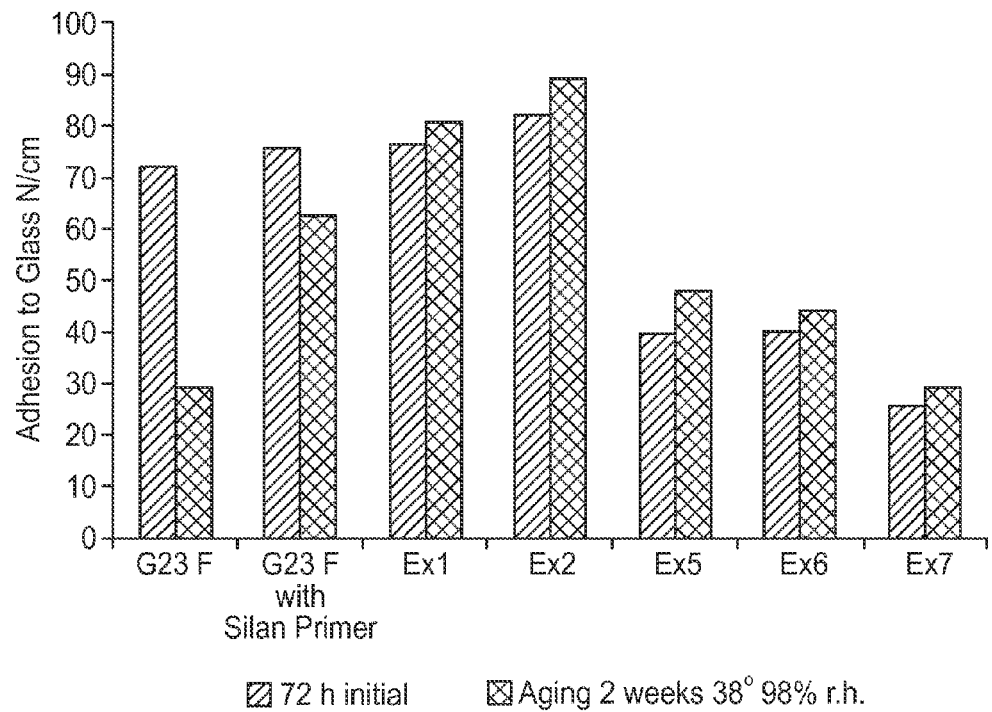
FIGS. 5 to 7 show the aging behavior of dual-layer PSA films containing N-vinylcaprolactam.
Figure 6:
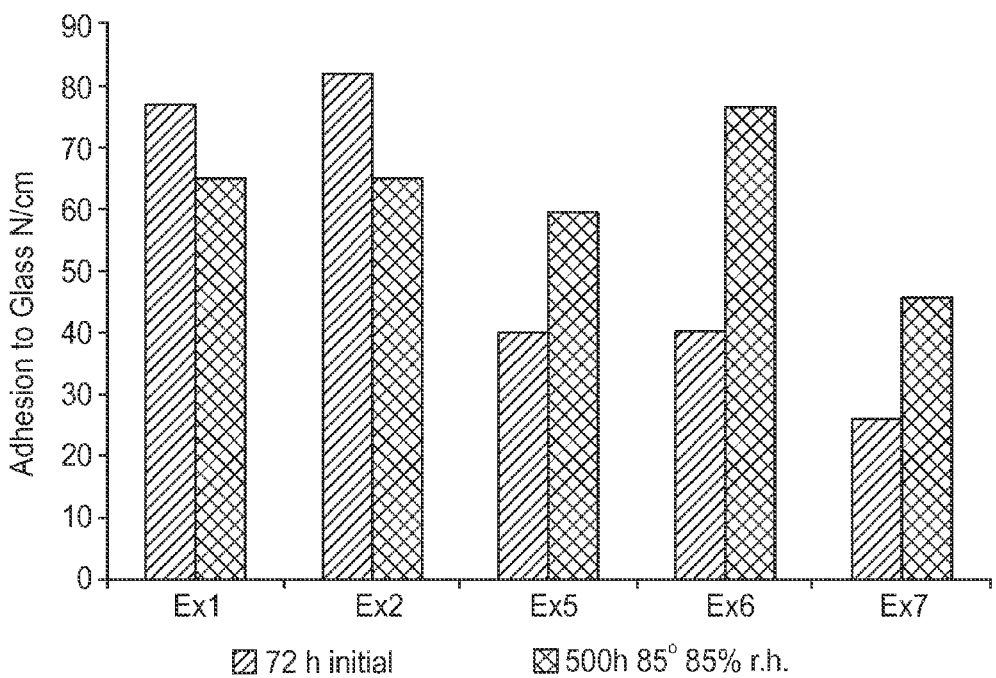
Figure 7:
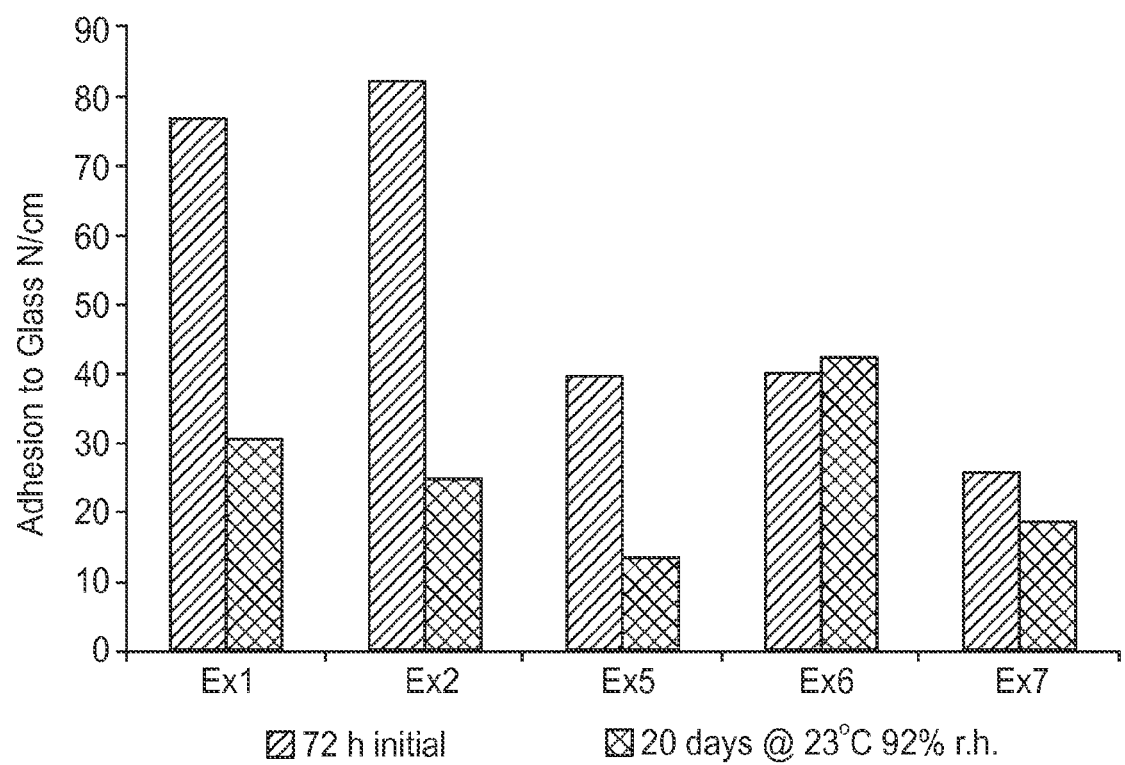

The results summarizing the test values of the single-layer foam constructions based on LPF 1 to LPF 5 referred to respectively as Ex.3 to Ex.7 are shown in FIG. 5 to FIG. 7. The main difference between these single-layer foam constructions is not just the selected silicone but also the selected co-monomer which is either NVC, IBOA or THF-acrylate. The test results reveal again that the inventive tapes containing the oligomeric silicone show better peel adhesion and longer shelf-life. As can be seen from example 6, these positive effects can further be enhanced by the addition of N-vinylcaprolactam to the PSA formulation and the parallel reduction of acrylic acid (AA).

Table 6 below shows the 90° peel test results of Ex.8 versus Ex.2, which are both dual-layer skin/core constructions differing only by the fact that Ex.8 skin layer does not contain any oligomeric silicone. The 90° peel tests are measured after a 72 h dwell time at 23° C.+/−2° and after the following aging cycle: 4 h at 40° C., 4 h at 90° C., 16 h at 38° C./98% r.h. run for 14 days. As comparative examples, acrylic foam tape GT 6008, as well as tape GT 6008 in combination with 3M Silane Glass Primer, are used.

TABLE 6

| Example No. | 72 h dwell at RT (NT/cm) | 14 day aging cycle |
|-------------|--------------------------|---------------------|
| Ex. 2 | 53.62 | 56.23 |
| Ex. 8 | 53.57 | 40.97 |
| GT 6008 (comparison) | 24.80 | 19.71 |
| GT 6008 with silane primer | 42.14 | 37.20 |

After a two-week ageing under humid conditions (4 h at 40° C., 4 h at 90° C., 16 h at 38° C./98% r.h.), it can be seen that the dual-layer skin/core construction of Ex.2 increases the bond to the glass surface when compared to the dual-layer skin/core construction of Ex.8. Without wishing to be bound by theory, it is believed that such an improvement is due to the hydrolysis of the silane and the condensation with the glass surface. Furthermore, it can be seen that the comparative tape GT 6008 does not reach the 90° peel values of the dual-layer skin/core construction of Ex.2, even when combined with a silane primer.

LIST OF REFERENCE NUMBERS

1 coating apparatus
2 coating knife
3 coating knife
4 substrate
5 downstream direction
6 coating chamber
7 rolling bead
8 release liner
9 precursor layer
10 precursor layer
11 skin layer
12 foam layer
13 assembly
14 glass substrate
15 metal substrate
I-II consecutive numbering of coating stations starting from the rolling bead (if present) as the most upstream coating station with the following coating chambers numbered in downstream direction

We claim:

1. A multilayer pressure sensitive adhesive (PSA) film having a first pressure sensitive adhesive layer for bonding glass substrates and at least a second opposing layer, the first pressure sensitive adhesive layer being a polymerization reaction product of a precursor comprising a monomer or a partially prepolymerized monomer having a curable ethylenically unsaturated group, whereas the precursor further comprises an oligomeric organofunctional silicone having at least 2 Si atoms, in particular 2 to 10 Si atoms,
  wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group,
  or
  wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;
  with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group.

2. The PSA film according to claim 1, wherein the coupling group having a Zerewitinow-active H-atom is selected from C—H acidic organic groups, —OH, —SH, —COOH, —NH$_2$ or —NHR with R being an organic rest.

3. The PSA film according to claim 1, wherein the coupling group which is reactive to the coupling group with a Zerewitinow-active H-atom is selected from an epoxy group, —NCO, —SCO or an aziridine group.

4. The PSA film according to claim 1, wherein the silicone has the general Formula (I):

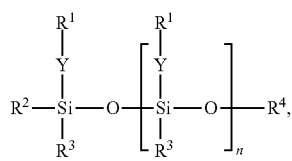

Formula (I)

wherein:
R$^1$ is an organic rest having at least one coupling group,
R$^2$ being a substituted or unsubstituted alkyl-, alkoxy- or alkenyl-group, like a methyl-, ethyl-, methoxy- or ethoxy-group, H or OH,
R$^3$ being an hydroxy-, a substituted or unsubstituted alkyl-, alkoxy- or alkenyl-group, in particular a methyl-, ethyl-, methoxy- or ethoxy-group,
R$^4$ being a substituted or unsubstituted alkyl- or alkenyl-group, like a methyl- or ethyl-group or H,
Y being a saturated or unsaturated substituted or unsubstituted hydrocarbon-di-radical and
n being an integer ≥1, in particular from 1 to 9, especially 2 to 7, further preferred 3 to 6.

5. The PSA film according to claim 4, wherein R$^1$ comprises an epoxy group, a hydroxyl group, a primary or secondary amine group or an aziridine group as coupling group, wherein R$^2$ is in particular a hydrogen atom and/or wherein Y—R$^1$ is in particular represented by the radical of Formula (II):

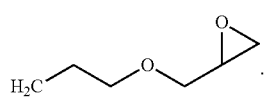

Formula (II)

6. The PSA film according to claim 1, wherein the monomer having the curable ethylenically unsaturated group and the coupling group with a Zerewitinow-active H-atom is selected from acrylic acid and/or methacrylic acid.

7. The PSA film according to claim 1, wherein the first pressure sensitive adhesive contains 0.05 to 2 wt.-% of the oligomeric organofunctional silicone.

8. The PSA film according to claim 1, wherein the precursor of the first pressure sensitive adhesive layer comprises an acrylic monomer or a partially prepolymerized acrylic monomer.

9. The PSA film according to claim 1, wherein the first pressure sensitive adhesive layer containing the silicone is substantially free of filler particles, cavities in the form of microspheres, expendable microspheres, in particular pentane filled expendable microspheres or gaseous cavities or glass bubbles.

10. The PSA film according to claim 1, wherein the second opposing layer contains filler particles, cavities in the form of microspheres, expendable microspheres, in particular pentane filled expendable microspheres or gaseous cavities, glass bubbles or combinations thereof.

11. The PSA film according to claim 1, wherein the second opposing layer is a pressure sensitive adhesive layer.

12. The PSA film according to claim 1, wherein the precursor of at least one pressure sensitive adhesive layer contains an acrylic monomer with at least one amide group, in particular N-vinylcaprolactam, N-vinylpyrrolidone, acryloxyl morpholine, N-isopropylacrylamide, diacetone acrylamide or mixtures thereof, especially the precursor of the first pressure sensitive adhesive layer.

13. A continuous self-metered process of forming a multilayer film having pressure sensitive characteristics and comprising at least two superimposed polymer layers, wherein the process comprises the steps of:
(i) providing a substrate (4);
(ii) providing two or more coating knives (2, 3) which are offset, independently from each other, from said substrate (4) to form a gap normal to the surface of the substrate (4);
(iii) moving the substrate (4) relative to the coating knives (2, 3) in a downstream direction (5),
(iv) providing curable liquid precursors of the polymers to the upstream side of the coating knives (2, 3) thereby coating the two or more precursors through the respective gaps as superimposed layers (9, 10) onto the substrate (4), the precursor comprising a monomer or a partially prepolymerized monomer, the monomer having a curable ethylenically unsaturated group, whereas the precursor further comprises an oligomeric organofunctional silicone having at least 2 Si atoms, in particular 2 to 10 Si atoms,
wherein the monomer having a curable ethylenically unsaturated group further has a coupling group with a Zerewitinow-active H-atom and wherein the oligomeric organofunctional silicone has at least one coupling group which is reactive to the coupling group of the monomer having a curable ethylenically unsaturated group,
or
wherein the oligomeric organofunctional silicone has at least one coupling group with a Zerewitinow-active H-atom and wherein the monomer having a curable ethylenically unsaturated group further has a coupling group which is reactive to the coupling group of the oligomeric organofunctional silicone;
with the proviso that if the monomer having a curable ethylenically unsaturated group further has a coupling group with a Zerewitinow-active H-atom which is selected to be —OH, then the coupling group of the oligomeric organofunctional silicone which is reactive to the coupling group of the monomer having a curable ethylene group cannot be selected to be an amino group;
(v) optionally providing one or more solid films (8) and applying these essentially simultaneously with the formation of the adjacent lower polymer layer, and
(vi) curing the precursor of the multilayer film thus obtained;

wherein a lower layer of a curable liquid precursor is covered by an adjacent upper layer of a curable liquid precursor or a film, respectively, whereas at least one of said precursors has pressure sensitive characteristics after the curing step (vi), in particular the precursor comprising the oligomeric silicone.

14. The process according to claim 13, wherein the precursor layers are cured thermally and/or by exposing them to actinic radiation after they have passed the back wall of a coating apparatus (1).

15. A multilayer pressure sensitive adhesive film obtainable by the process according to claim 13.

* * * * *